(12) United States Patent
Streuter et al.

(10) Patent No.: US 9,691,067 B2
(45) Date of Patent: Jun. 27, 2017

(54) VALIDATION DATABASE RESIDENT ON A NETWORK SERVER AND CONTAINING SPECIFIED DISTINCTIVE IDENTIFIERS OF LOCAL/MOBILE COMPUTING DEVICES MAY BE USED AS A DIGITAL HARDWARE KEY IN THE PROCESS OF GAINING AUTHORIZED ACCESS TO A USERS ONLINE WEBSITE ACCOUNT SUCH AS, BUT NOT LIMITED TO, E-COMMERCE WEBSITE ACCOUNT, ONLINE FINANCIAL ACCOUNTS AND ONLINE EMAIL ACCOUNTS

(71) Applicant: Invysta Technology Group, Henderson, NV (US)

(72) Inventors: Gary William Streuter, Laguna Niguel, CA (US); William Pat Price, Henderson, NV (US)

(73) Assignee: Invysta Technology Group, Henderson, NV (US)

( * ) Notice: Subject to any disclaimer, the term of this patent is extended or adjusted under 35 U.S.C. 154(b) by 0 days.

(21) Appl. No.: 14/717,352

(22) Filed: May 20, 2015

(65) Prior Publication Data
US 2016/0277382 A1 Sep. 22, 2016

Related U.S. Application Data

(60) Provisional application No. 62/134,980, filed on Mar. 18, 2015.

(51) Int. Cl.
| | |
|---|---|
| G06F 21/00 | (2013.01) |
| G06Q 20/40 | (2012.01) |
| H04L 29/06 | (2006.01) |
| G06Q 20/38 | (2012.01) |

(Continued)

(52) U.S. Cl.
CPC ............ *G06Q 20/40* (2013.01); *G06Q 20/02* (2013.01); *G06Q 20/1085* (2013.01); *G06Q 20/382* (2013.01); *G06Q 20/409* (2013.01); *G06Q 20/4097* (2013.01); *G06Q 20/40145* (2013.01); *H04L 63/083* (2013.01);
(Continued)

(58) Field of Classification Search
CPC .............................. G06F 21/33; H04L 9/3213
USPC .......................................................... 726/7
See application file for complete search history.

(56) References Cited

U.S. PATENT DOCUMENTS

| | | | | |
|---|---|---|---|---|
| 2012/0284195 A1* | 11/2012 | McMillen | .......... | G06Q 20/3223 705/71 |
| 2014/0032906 A1* | 1/2014 | Corella | ............... | H04L 63/0869 713/168 |

* cited by examiner

*Primary Examiner* — Anthony Brown

(57) ABSTRACT

The present invention consists of methods whereby local/mobile computing devices are registered by collecting a set of hardware and/or software distinctive identifiers to be saved in a validation database residing on a validation database server/Web server, such that the local/mobile computing device can be used as a digital hardware key for right of access and authorization of electronic transactions. This is done by comparing a regenerated set of hardware and/or software distinctive identifiers with those previously registered in the validation database in order to validate the identity of the local/mobile computing device. The invention consists of a first software program executing on a local/mobile computing device that generates the set of hashed and/or encrypted hardware and/or software distinctive identifiers and a second software program resident residing on a validation database server/Web server that manages the validation database.

13 Claims, 13 Drawing Sheets

(51) Int. Cl.
*G06Q 20/02* (2012.01)
*G06Q 20/10* (2012.01)

(52) U.S. Cl.
CPC ........ *H04L 63/0861* (2013.01); *H04L 63/102* (2013.01); *H04L 2463/082* (2013.01)

Registration On Validation Server, No Escrow

Registration On Validation Server, Escrow

Registration Through Transaction Certifying Authority Server, No Escrow

Registration Through Transaction Certifying Authority Server, Escrow

Transaction, Card Not Present

Transaction With Card Present

Transaction, Web Access

Transaction, Application Access

Transaction, Physical Access

VALIDATION DATABASE RESIDENT ON A NETWORK SERVER AND CONTAINING SPECIFIED DISTINCTIVE IDENTIFIERS OF LOCAL/MOBILE COMPUTING DEVICES MAY BE USED AS A DIGITAL HARDWARE KEY IN THE PROCESS OF GAINING AUTHORIZED ACCESS TO A USERS ONLINE WEBSITE ACCOUNT SUCH AS, BUT NOT LIMITED TO, E-COMMERCE WEBSITE ACCOUNT, ONLINE FINANCIAL ACCOUNTS AND ONLINE EMAIL ACCOUNTS

This application claims priority from provisional application No. 62/134,980, filed Mar. 18, 2015, the entire contents of which are herewith incorporated by reference.

CROSS REFERENCE

The present application is related to provisional application No. 61/414,679 filed Nov. 17, 2010, the disclosure of which is hereby incorporated by reference.

FIELD OF INVENTION

The invention relates to secure authorization of electronic transactions and/or a right of entry to access secure locations through a matching function of regenerated specified distinctive identifiers drawn from a local/mobile computing device to those specified distinctive identifiers previously registered in a validation database, in order to validate the identity of the local/mobile computing device.

BACKGROUND

In the cyber world we live in, the issue of security has risen to new heights of awareness and concern. This can range from the security of your financial and personal data to even issues of physical security. The concept of right to enter and authorized access are under siege from relatively new innovations such as the Internet that have made so much information available to anyone with the simple press of a button. Want to know something—just Google® it!

As wonderful as the connectivity we enjoy today is, it has also opened many avenues for hackers and criminals to exploit our personal information, as well as our data and even access to secure physical locations. With the invention described in this disclosure, the inventor's goal is to provide the rightful owners of data, accounts, applications and property with a digital hardware key that validates the identity of a local/mobile computing device that initiates an access or authorization request in order to protect themselves against sophisticated hackers and criminals.

The methods described in this disclosure can be used to provide multi-factor authentication of authorization and access requests by creating a digital hardware key which may be used to validate the identity of a local/mobile computing device that is initiating the request and determine if said local/mobile computing device has previously been registered for use in this transaction by the rightful owner of the account. The inventors consider this invention to be an important development in the use of multi-factor security schemes designed to insure the rightful use of said accounts. There are many potential uses of the technology and by way of background, let us examine a number of the various security scenarios that can be addressed by this invention.

Unauthorized Access to Credit/Debit Card and Bank Accounts:

The problem of credit/debit card and back account fraud, as well as identity theft, has become so wide spread that Americans today regard it as the major crime threat that might directly affect them. This has been well documented by the Gallup organization (http://www.gallup.com/poll/178856/hacking-tops-list-crimes-americans-worry.asp) where it was found that "62% of Americans worry about computer and smart phone hacking".

The widespread revelations regarding security breaches at major retailers, businesses and some government entities have unsettled the consumer market. Consumers are becoming very apprehensive about using their credit/debit cards, both in stores, as well as with e-Commerce purchases. To understand the gravity of the situation, one needs to look no further than the customer relations damage inflicted on the retailer Target when it became known that their customer information databases had been breached and had affected as many as 110 million people.

And these breaches continue at an accelerated pace, as evidenced by the recent disclosures of financial data breaches at additional major retailers and banks such as Home Depot and Chase Bank. In addition, approximately 80 million user's medical and financial information have recently been compromised by a breach of the Anthem Blue Cross medical network.

The financial industry defines two major types of consumer credit/debit card usage:
 Card Not Present Transaction: A credit or debit card transaction that is initiated over a network such as the Internet during an e-Commerce transaction, whereby the credit/debit card is not physically available for inspection and verification by the merchant.
 Card Present Transaction: A credit or debit card transaction that is typically made at a point of sale (POS) terminal or an Automated Teller Machine (ATM) where the physical account card is present and used to initiate the transaction.

In particular, e-Commerce card not present credit/debit card and bank type account (checking/savings etc) fraud is growing at an alarming rate and threatens to further to erode consumer confidence in their ability to securely make purchases via e-Commerce websites on the Internet.

The problem that exists in the e-Commerce ecosystem is the ability of hackers/criminals to use the massive amounts of personal identification and financial account information from the types of data breaches that have been referenced earlier. The hackers/criminals can use this information for illicit financial gain by initiating a massive amount of fraudulent e-Commerce transactions, without the knowledge or consent of the rightful account owner. This is typically done by using breached credit/debit or bank account information. In today's e-Commerce ecosystem, the consumer has very few reliable tools available to insure that their information is safe and cannot be used to complete fraudulent e-Commerce transactions. The inventor's goal is to massively reduce the scale from which these hackers/criminals can unjustly benefit from these widespread data breaches, with an ultimate goal of totally eliminating this threat.

Some steps are already being taken by the financial community to reduce card not present financial fraud. Visa and MasterCard, which act as branding networks in the credit/debit card market, are both introducing enhanced security measures that allow the rightful account owner to add a password to their account, which is then required when a card not present transaction occurs. Visa Verified and MasterCard Secure Code are being rolled out through their participating financial card issuers. While the inventors welcome this step, history has shown us how vulnerable even a strong password can be to hacking. While these steps are a good start to improving card not present security, given the sophistication of the modern hacker/criminal, a password alone cannot be counted on to eliminate or massively scale down this epidemic of fraudulent transactions.

With regard to card present transactions, once again, the problem that exists today is this ability of hackers/criminals to obtain massive amounts of personal identification and financial account information from the types of data breaches that have been referenced earlier. The hackers/criminals then use this information for illicit financial gain in a number of ways. Because most credit/debit cards in use in the United States still use a magnetic stripe on the physical card that contains the account owner's information, the hackers/criminals have become adept at duplicating these cards and incorporating magnetic strips that include the data obtained via the data breaches. In today's credit/debit card ecosystem, the consumer has very few reliable tools available to insure that their information is safe and cannot be used to complete fraudulent card present financial transactions.

Steps are also being taken by the financial community to reduce card present financial fraud. There is a major transition taking place in late 2015 that will see the replacement of physical credit/debit cards with magnetic strips to a newer generation of cards that have a semiconductor chip embedded within the card. These new "Chip & Pin" cards will also require that the account owner select and use a personal identification number (PIN) in order for the new chip & PIN card to complete a card present transaction at a POS terminal. This step is similar to the PIN requirement present today when using an ATM card for a transaction. Once again, the inventors strongly applaud this industry security upgrade and believe that the inclusion of the semiconductor chip embedded in the card will help reduce the fraudulent duplication of credit and debit cards. However, here again we may continue to be at the mercy of these sophisticated hackers/criminals as they develop new methods to breach these chipped cards.

There is also another transition taking place in the card present environment whereby credit and debit accounts are no longer being represented by a physical card, but that account information is being embedded within mobile computing devices which communicate directly with the POS and ATM terminals. Foremost among these new security schemes is Apple Pay, developed by Apple Computer. With the Apple Pay system, the account owner's financial information is secured within the mobile device. The Apple mobile device communicates credit/debit card account information directly to the POS or ATM terminal via a short range communication protocol. In the case of Apple Pay, the communication is established over a Near Field Communication (NFC) link. The completion of the card present transaction also requires the account owner to supply a bio metric marker, in this case a fingerprint scanned by the mobile device, or a pre-established password that can be entered via the keypad of the mobile computing device.

While the Apple Pay release has generated interest, the inventors feel there are several major concerns in the ability of the consumer market to adopt Apple Pay:

1. First and foremost is the requirement that the mobile computing device used in the account transaction must be manufactured and supported by Apple. While Apple iPhone mobile computing devices have a sizable worldwide following, other mobile computing devices from other companies and using different operating software (such as Android) compose the majority of the mobile computing devices available in the worldwide marketplace. Because these other mobile computing devices are not supported by Apple, they do not have the ability to run the Apple Pay system, and thus cannot be used to complete a card present transaction.

2. The account owner must embed personal and financial information within a mobile computing device that lends itself to being lost or stolen. This can create additional security concerns for users of Apple Pay. Although Apple has used its best efforts to insure that this information cannot be accessed in the event the mobile computing device falls into the wrong hands, we must understand that even these best efforts may not be sufficient. If there is anything we should take away from the rash of data breaches we have experienced recently, it is that there is never a guarantee that data cannot be breached. That threat of breach even extends to data breaches at the governmental level, where despite the presence of almost unlimited resources, breaches still occur.

The third concern has to do with the need for a new experiences such as Apple Pay to affect a change in habits among consumers using credit/debit cards. It is what is referred to as a learning curve, and the inventors experience has been that the steeper the learning curve, the slower the adoption rate. Almost every consumer in the world understands the basics of how to use a credit/debit card to complete a card present transaction. Our wallets are stuffed with credit/debit cards and most of us have grown up understanding how to use this card technology. Old habits sometime die hard and we question the willingness of a substantial part of the card using population to abandon that method for what may be an even more flawed technology. The inventors realize that the march of technology moves on, and that a number of other companies such as Google, are already working on card present authentication schemes to rival Apple Pay. The inventors welcome these advances but we continue to believe that the best solution available for insuring the validation of a credit/debit card in a card present transaction is the approach respectfully submitted in this disclosure.

Another area of concern addressed by this invention is the verification of paper checks being submitted for purchases of goods or services. Given the sophistication of modern printing techniques and the ability of hackers/criminals to obtain your complete banking records, the use of this invention can serve as a validation step in the processing of these paper checks.

Given the risk of financial card fraud described above, the inventors would ask one very basic question: Why is it necessary that your credit/debit card or bank type account (checking/savings etc) have the ability to initiate and complete a financial card transaction initiated from the billions of local computing devices in use all around the world? The obvious answer is that account owners do not require, nor need this type of universal access for their authorized transactions. Research reveals for instance, that typically an average e-Commerce user will use three to five local/mobile computing devices to complete their transactions. This includes local/mobile computing devices such as their personal computers, tablet devices, PDA's and their ever present Smart Phones that are used to complete these card transactions.

Unauthorized Website Access:

The average person visits many websites each month and often has an account on said website. These website visits may be to make an online purchase, pay a bill, check email, reconcile a bank account or it may even just be a web surfing adventure. Many of these websites encourage/demand that the visitor create an account with the website in order to gain access to the website. In most cases, the only security requirement needed to establish this account and access to the website is the creation and entry of a user name and password. In the inventors view, this represents a very low security bar and easily falls prey to exploitation by hackers/criminals.

In addition, the problem of unauthorized website access has grown rapidly as users have become more comfortable with the use of remote storage, more commonly referred to as Cloud Storage, to store and access their various data files, including pictures, videos and documents considered highly personal.

Not only has this type of unauthorized website access been used to generate financial gain for the hacker/criminal, it can also cause major embarrassment, as has happened in many instances with the continual stream of racy/explicit photos and videos of celebrities (and others) that the rightful owners of the account thought were safe from view in the cloud, but end up being splashed across the Internet and other venues. In addition, the growth in use of email and social media around the world has led to unauthorized breaches (think Sony breach) of even personal communications such as email or tweets, once again causing major embarrassment, and even harm to the rightful owner of the account.

Here again, the inventors are convinced that the use of the basic concepts of this invention will add a new layer of data security for the rightful account owners.

Unauthorized Physical Access to Places or Things:

The Internet of Things is upon us and growing rapidly. Its influence is expected to grow rapidly in the years to come. This Internet of Things will extend to our homes, businesses, hobbies, education and just about every other facet of our lives. Secured spaces and things that are connected to a network/Internet will be common place and given the sophistication of hackers/criminals, it is realistic to believe that as this market matures, so too will attempts to gain unauthorized access to these systems.

One of the most reasonable areas of growth in the use of the Internet of Things is in securing access to physical spaces and things. This may include physical access doors, safes and safety deposit boxes, filing cabinets, automobiles and other vehicles as well as many other physical devices, locations or functions. The key to this development is the ability of these network connected locking devices to communicate with local/mobile computing devices via a network and/or the Internet.

As this method of securing physical spaces and things becomes mainstream, it will be important to safeguard against unauthorized access by hackers/criminals in order to make sure that the level of security we believe we have achieved, is in fact really secure and not subject to exploitation.

If for instance, the locks on our home doors are electronic and those locks are connected to the local network/Internet, the access to entry may be exposed to an attack by a hacker/criminal.

For many years we have seen the use of electronic locks primarily in hotels and businesses that use a physical card that uses a magnetic stripe on the card, or may even use a short range communications protocol such as Near Field Communications (NFC) or Radio Frequency Identification (RFID) to communicate between the physical card and the electronic locking mechanism to authorize access. At hacker's convention in Las Vegas in 2012, a simple digital hack to unlock hotel doors using a magnetic strip card reader door lock was revealed. Over 4 million hotel rooms are at risk using a similar $50 home built electronic device and as of this writing, the lock manufacturer has not retro fitted their door locks to prevent this hack.

As the Internet of Things moves forward and the world is even more connected, we will see the continued expansion of the use of electronic locking devices that communicate with both our local/mobile computing devices and a network/Internet, in order to authorize access to physical spaces and things. This access door analogy only represents the tip of the iceberg and network/Internet connected electronic locks will be used to regulate access to anything physical that the rightful owner wishes to keep secure.

However, for this expansion to continue, it will become extremely import to insure that authorization for physical access is not compromised and misused. The inventors are confident that the ability of our technology to validate the identity of a local/mobile computing device being used to gain access to the secured space or thing will greatly increase real world security.

Unauthorized Access to Applications and Data:

Basic electronic security today is under serious assault. This even extends to the ability of hackers/criminals to turn on and breach applications and data on our local/mobile computing devices, without our knowledge or consent. In most cases, all that is required is a simple hack that collects the rightful account owners user name and password and from there, access to the users applications and data. Malicious code can be implanted on an electronic device which gives the hacker/criminal complete control of the local/mobile computing device. We receive a steady stream of updates for Windows, Android and Apple operating systems and from application providers because as fast as these companies react to these hack threats, new ones appear and this appears to be a never ending cycle.

This problem also extends to the developers of software applications who may sell/lease their software applications and operating systems (OS) based on a specific license for use that only entitles the purchaser of the application to use said application/OS on a defined number of local/mobile computing devices. While these developers attempt to control this situation with a process that provides serialization of the application and the hope for accountability, it is unfortunate that the hackers/criminals have countered this move by releasing software programs that allow the serialization of the application/OS to be breached, and thus allows the use of said application/OS on more local/mobile computing devices than authorized by the purchase/lease license arrangement. The net result of this is billions of dollars in lost sales and profits to the legitimate companies that pioneer and support these applications and OS's.

It is also common today for business users in particular to provide a means of security for some or all of the data present on their local/mobile computing devices and this trend is slowly making it way to the consumer segment of the market.

A common method of securing the desired data is a process known as encryption. Encryption is a mathematical algorithm that scrambles the data elements in a systematic fashion in order to make them unrecognizable. Once encrypted, the data is unusable in the event that an account is breached and the encrypted data stolen. Access to the encrypted information is typically handled by a manager type software program which controls and validates access to the encrypted data.

However, encrypted data can be returned to its original state by a process known as un-encrypting. During the process, the encrypted data is run through another mathematical process based on the original algorithm used to encrypt the data. If this process is completed successfully, the data becomes recognizable.

Because of the sophistication of the hacker/criminal community, encryption is not always as safe as one might believe. Hackers have had great success with reversing the process and gaining access to the recognizable data. While encryption levels of sophistication vary, even the most stringent encryption methods may not be immune from hacking and exposure of the data. This point has been recently demonstrated as earlier this week, security experts disclosed a new vulnerability called the FREAK flaw that affects web encryption, Android and Apple devices, as well as approximately 10% of the top 10,000 websites are vulnerable to it.

Once again, the inventors believe that the introduction of the local/mobile computing device as a digital hardware key into the security equation will have a profound effect on cyber security in general.

SUMMARY OF THE INVENTION

An intent of the present invention is to insert a local/mobile computing device, known and approved by the rightful owner of the account, as a digital hardware key into the approval process required for gaining access and authorization. This access may address secure financial card/bank accounts, software applications, websites and physical things among other opportunities. In essence, the present invention validates the identity of a local/mobile computing device being used to initiate the access or authorization request and insures that the request is coming from a local/mobile computing device previously registered in the validation database and fully authorized for said use by the rightful account owner. In other words, even if the hacker/criminal has an account owner's complete personal and financial data, including their password or a forced biometric marker, the access/authorization request will not be approved unless it is being initiated by the rightful account owners local/mobile computing device, which is registered in the validation database. This invention provides a huge step forward in achieving security by greatly enhancing the use of multi-factor authentication techniques to reduce the scale of fraudulent transactions.

The methods defined by this invention provide a local/mobile computing device, known and approved by the rightful account owner, be registered with the validation database described in this disclosure. A registered device may be used to initiate the request for authorization or access to the secure account in order for the request to be approved. By validating the identity of the local/mobile computing device against those values maintained in the validation database, the invention insures that the access request is being made from a device known and previously registered by the rightful account owner. The inclusion of the identity of the local/mobile computing device into the authorization equation creates the requirement for inclusion of something physical into the access/authorization request and thus, there is no longer any opportunity to gain unauthorized access simply in a simply cyber fashion. The local/mobile computing device becomes the rightful account owner's digital hardware key, and much like a typical mechanical key, it must be part of the process for successful authorization and access.

Additionally, when a request for access authorization is initiated, the specified distinctive identifiers are regenerated for each access/authorization request from the local/mobile computing device and matched to the values registered in the validation database.

The embodiments of this invention also describe a quarantine/escrow function whereby the specified distinctive identifiers transmitted by the first software program to the second software program for insertion into the validation database during the initial registration process may be held in quarantine/escrow prior to being inserted into the validation database. Said specified distinctive identifiers held in quarantine/escrow may be held until a secondary confirmation of the intent to register said local/mobile computing device is received by the second software program from the transaction certifying authority or direct from the rightful account owner.

It is also important in this summary to note several unique attributes of this invention.

- Said first software program may remain resident in the local storage of the local/mobile computing device
- Said first software program may remain resident within an Internet browser of the local/mobile computing device.
- Said first software program may be a run/terminate/dissolve program that never stays resident in the local/mobile computing device and is re-introduced for each requested transaction.
- Said first software program may have a unique identification indicator which may also be included within the specified designated identifiers submitted by said first software program to said second software program for registration in and matching to the validation database.
- Said second software program may contain a feature whereby specified distinctive identifiers transmitted to it by said first software program may be quarantined/escrowed pending a release generated by the transaction certifying authority, said release dependent on positive confirmation of the registration of said local/mobile computing device by the rightful account owner.
- Said specified designated identifiers collected in either the registration or regeneration processes by said first software program never remain resident, in one embodiment, in the local/mobile computing device in any form and are regenerated by said first software program in real time for each transaction submitted.
- Said validation database is composed of anonymous data that cannot be associated on its own with any local/mobile computing device.
- Said match or no/match of the regenerated specified distinctive identifiers collected by said first software program during the processing of the current transaction, in comparison to the registered specified distinctive identifiers contained in the validation database, may be based on all, or only a plurality of matching specified distinctive identifiers, whereby said level of matching required for approval may be set by said transaction certifying authority and may vary from account to account.
- The validation database resident on the validation database server/Web server contains no specific user information such as name, address, birth date, place of birth, or financial/card account information.

A plurality of specified distinctive identifiers to be collected during a registration process may contain a state flag that allows those flagged specified distinctive identifiers to be set to ignore when determining a match between said regenerated specified distinctive identifiers to said registered specified distinctive identifiers contained in said validation database.

A request to execute first software program contains a flag that notifies the first software program that the collection of said specified distinctive identifiers by said first software program is either an initial registration of, or regenerated of values of said specified distinctive identifiers and the appropriate flag is included with the transmittal of said specified distinctive identifiers collected by said first software program.

DETAILED DESCRIPTION

Definitions

Figure 1:
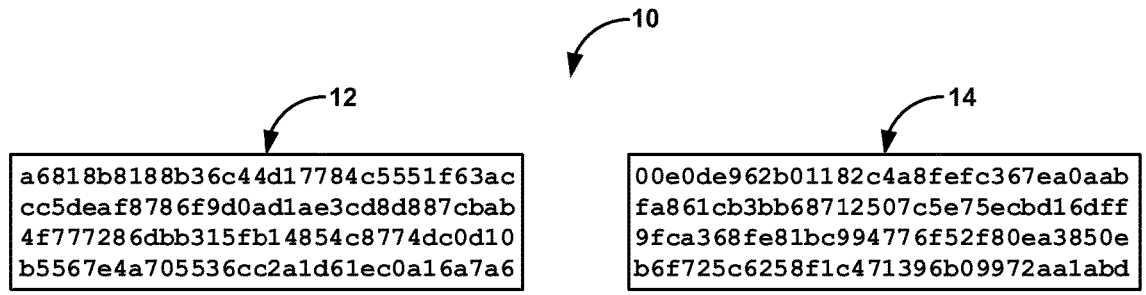
FIG. 1 is a depiction of the result of two short strings after being hashed.

Applications/Operating Systems/Secure Data: This refers to software programs and secured data that are resident on a local/mobile computing device which also is the device that is executing the first software program.

Bio Metric Marker: A physical identifier of the rightful account owner such as, but not limited to, a finger print or an iris scan and which may be included in the specified distinctive identifiers.

Card Issuer: A financial institution, bank, credit union or company that issues or helps issue cards to cardholders.

Card Not Present Transaction: A credit or debit card transaction made over a network such as the Internet during an e-Commerce transaction, whereby the credit/debit card is not physically available for inspection and verification by the e-Commerce merchant.

Card Present Transaction: A credit or debit card transaction typically made at a point of sale (POS) terminal or an Automated Teller Machine (ATM) where the physical account card is present and used in the financial settlement of the transaction. This term may also apply to the use of a paper check for settling a financial transaction for goods or services where the submitter of the paper check is physically present.

Card Processor: Typically called an acquirer, this bank or financial institution processes and settles a merchant's credit card transactions with the help of a card issuer.

Level of Compliance Required to Authorize a Transaction: A preset matching requirements that determines if regenerated specified distinctive identifiers meet the level of compliance required for transaction authorization and this level may be set by the transaction certifying authority and whereby this level of compliance may vary between transaction certifying authorities.

Local/Mobile Computing Device: Personal computer, Smartphone, PDA, Tablet etc or similar mobile devices containing a processor, memory and storage, and capable of addressing a validation database server/Web server via a network.

Multi-Step Authentication: The use of a plurality of personal information, passwords, bio metric markers as well as specified distinctive identifiers of a local/mobile computing device in the process of authenticating an authorization or access request.

Network Connected Securing Mechanism Acting as the Transaction Certifying Authority: A security mechanism such as a physical electronic lock that is used to grant access to something physical and that is connected to a network or a Web Server.

Password: A secret code typically only known by the rightful account owner and a transaction certifying authority and which may be included in the specified distinctive identifiers.

Physical Spaces or Things: This refers to physical locations or physical devices that contain some type of network connected mechanical/electrical securing system as a means of validating and allowing access to said location or device. Examples of this may be access doors/gates, automobiles, windows, safes and safe deposit boxes among others.

Regeneration: The process whereby said first software program defined in this disclosure extracts anew, with each execution request, the specified distinctive identifiers from a local/mobile computing device that is initiating a transaction as part of an authorization/access process. These regenerated values are submitted to a second software program residing on a validation database server/Web server for matching with the values previously stored in a validation database during the registration process in order to validate the identity of a local/mobile computing device.

Registration: The process whereby the first software program defined in this disclosure completes an initial process of collecting specified distinctive identifiers from a local/mobile computing device and transmits those values (directly/indirectly) to a second software program residing on a validation database server/Web Server, which then inserts these values into a validation database.

Secure Account: Used to denote devices, accounts, data or places that are secured and may be addressed by this invention.

Secure Element: Used to denote devices, accounts, data or places that are secured and may be addressed by this invention.

Specified Distinctive Identifiers: A group of defined serial numbers and/or other digital characteristics, which may be considered unique, collected by a first software program from the hardware and software modules resident on a local/mobile computing device and for purposes of this disclosure, may also include a unique string of data inputted by the account owner, such as a password or biometric marker, and/or a unique identification number assigned to said first software program.

Transaction: For purposes of this disclosure, the term transaction may refer to general transaction requests, financial transaction requests or requests for access.

Transaction Certifying Authority: The entity that is authorized to approve or deny specific transactions or access requests. Examples of certifying authorities are, but not limited to, credit/debit card processor or issuer, a financial institution such as a bank or credit union, a merchant website which hosts a user's account, software application/OS developer/providers, encryption management software applications or a service provider/monitoring entity in the case of physical access.

Unique Identification Number: A unique recognition number that may be assigned to said first software program and which may be included in the specified distinctive identifiers.

Unique String of Data: A collection of data such as passwords or biometric markers that are inputted into a local/mobile computing device by a account owner and may be included in the specified distinctive identifiers supplied to the validation database for matching.

Validation Database: A remote database of registered specified distinctive identifiers maintained on a validation database server/Web server and managed by a second software program.

Validation Request: A request to a first software program to regenerate specified distinctive identifiers and whereby said regenerated values are matched by a second software program to the registration values that are maintained in a validation database in order to validate the identity of a local/mobile computing device that initiated the transaction that spawned the validation request.

Validation Database Server/Web Server: A remote server system that includes a second software program and a validation database.

Problem Statement:

The sophistication of hackers/criminals has risen to the level whereby we cannot be confident in the level of protection we are actually achieving in securing access to our data, authorization of our account usage, applications/OS or physical access to secured places and things. What is needed is a method to further validate secure access and authorization that can prevent hackers/criminals from achieving volume scale by breaching our security systems.

Embodiments

In a basic embodiment of this invention, the local/mobile computing device that generates a request for authorization or access becomes an authenticating factor in a multi-factor authentication process, and is considered in the process of authorizing a financial transaction or in approving access. This is accomplished by the rightful owner of the local/mobile computing device registering said device with a validation database created by this invention. By registering said local/mobile computing device with said validation database, the rightful owner is giving his consent and approval for the presence of this device to be considered in approving or denying the transaction.

Because said registered local/mobile computing device is now part of the authorization process, the rightful owner of the account has another layer of protection in insuring that compromised personal and/or financial data cannot alone be used in fraudulent transactions. This additional layer of security exists because said fraudulent transaction may not be approved unless the identity of said local/mobile computing device is validated by matching said regenerated specified distinctive identifiers from said initiating local/mobile computing device to said specified distinctive identifiers previously stored in said validation database.

Explained in the embodiments below are four preferred embodiments detailing the process of the initial registration method of a local/mobile computing device to a validation database. Also explained are five preferred embodiments which detail a transactional method for different transactions and access to which this invention is targeted.

In a preferred embodiment of a non-escrow registration method of this invention, a rightful account owner makes a request to, or is required by a validation database server/Web server acting directly as a transaction certifying authority, to register a local/mobile computing device in a validation database residing in a validation database server/Web server in order that the unique identity of said local/mobile computing device may be used as a digital hardware key for authorization and access.

Upon receiving a registration request the first software program is electronically downloaded from the validation database server/Web server to said rightful account owner's local/mobile computing device. Said first software program then executes on said local/mobile computing device and manages the collection of said specified distinctive identifiers from said local/mobile computing device.

Said first software program collects a defined set of hardware and/or software identifiers drawn from said local/mobile computing device known and approved by the rightful owner of the account. The purpose of this process is to provide a baseline registration for later validating the identity of said local/mobile computing device in relation to a transaction seeking a confirmation of the identity of a local/mobile computing device.

Said first software program, recognizing that the collection of said specified distinctive identifiers is intended as an initial registration of the unique identity of said local/mobile computing device, flags said values as an initial registration.

The specified distinctive identifiers collected by said first software program during this initial registration process are based on specified distinctive hardware components of said local/mobile computing device, as well as specified distinctive software identifiers from said local/mobile computing device. In addition, the registration process may include a unique string of data, such as a password and/or a biometric marker that is entered by the rightful owner of the account and/or a unique identification number of said first software program, which may also become part of said specified distinctive identifiers that are collected during the registration process.

Once said first software program has executed and said specified distinctive identifiers have been collected, said first software program will process said specified distinctive identifiers by securing them prior to electronic transmission to the transaction certifying authority. Said first software program may also perform a hashing operation on said specified distinctive identifiers prior to securing them for electronic transmission.

When said first software program has completed securing said specified distinctive identifiers it will then electronically transmit said secured data to said validation database server/Web server that issued said first software program to said local/mobile computing device.

After transmitting said secured specified distinctive identifiers said first software program may remain resident in the memory/storage of said local/mobile computing device or resident in the web browser of said local/mobile computing device or may dissolve and no longer be resident on said local/mobile computing device upon completion of transmission of said secured specified distinctive identifiers.

Once the secured data has been electronically transmitted to said validation database server/Web server, said first software program will insure that no trace of said collected specified distinctive identifiers is retained within said local/mobile computing device. Memory used for the calculations, securing and maintaining of the resulting data (hashed/encrypted/both) is securely erased.

Said secured specific distinctive identifiers are received electronically by said validation database server/Web server.

Said second software program resident on the validation database server/Web server recognizes the flag inserted by said first software program that identifies said submittal as a new registration of a local/mobile computing device, prepares said values for insertion into said validation database file maintained on said validation database server/Web server.

Said specified distinctive identifiers are then inserted by said second software program into said validation database residing on said validation database server/Web server.

Upon successful insertion of said specified distinctive identifiers into said validation database, validation database server/Web server may notify the rightful account owner of the successful completion of the registration of said requested local/mobile computing device into said validation database.

In another preferred embodiment of an escrowed registration method of this invention, a rightful account owner makes a request to, or is required by, a validation database server/Web server to register a local/mobile computing device in a validation database in order that said local/mobile computing device may be used as a digital hardware key for authorization and access.

A first software program is then electronically downloaded from said validation database server/Web server to said local/mobile computing device being used to initiate the registration request. Said first software program then executes on said local/mobile computing device and manages the collection of said specified distinctive identifiers from said local/mobile computing device.

Said first software program collects a defined set of hardware and/or software identifiers drawn from said local/mobile computing device known and approved by the rightful owner of the account. The purpose of this process is to provide a baseline registration for later validating the identity of said local/mobile computing device in relation to a later transaction seeking a confirmation of the identity of a local/mobile computing device.

Said first software program, recognizing that the collection of said specified distinctive identifiers is intended as an initial registration of the unique identity of said local/mobile computing device, flags said values as an initial registration.

Said specified distinctive identifiers collected by said first software program during this initial registration process are based on specified distinctive hardware components of said local/mobile computing device, as well as specified distinctive software identifiers from said local/mobile computing device. In addition, the registration process may include a unique string of data, such as a password and/or a biometric marker that is entered by the rightful owner of the account and/or a unique identification number of said first software program, which may also become part of said specified distinctive identifiers that are collected during the registration process.

Once said first software program has executed and said specified distinctive identifiers have been collected, said first software program will process said specified distinctive identifiers by securing them prior to electronic transmission to said validation database server/Web server. Said first software program may also perform a hashing operation on said specified distinctive identifiers prior to encrypting them for electronic transmission.

When said first software program has completed securing said specified distinctive identifiers it will then electronically transmit said secured data to said validation database server/Web server that issued said first software program to said local/mobile computing device.

After transmitting said secured specified distinctive identifiers said first software program may remain resident in the memory/storage of said local/mobile computing device or resident in the web browser of said local/mobile computing device or may dissolve and no longer be resident at all on said local/mobile computing device upon completion of transmission of said secured specified distinctive identifiers.

Once the secured data has been electronically transmitted to said validation database server/website, said first software program will insure that no trace of the said collected specified distinctive identifiers is retained within said local/mobile computing device. Memory used for the calculations, securing and maintaining of the resulting data (hashed/encrypted/both) is securely erased.

Said secured specific distinctive identifiers generated by said first software program are received electronically by a second software program residing on a validation database server/Web server.

Said second software program determines if said specified distinctive identifiers received from said first software program should be assigned a quarantine/escrow status prior to insertion into said validation database and if said status is applied, continue to quarantine/escrow said secured specified distinctive identifiers until receiving an approval to release.

Said validation database server/website will send a confirmation notice of said local/mobile device registration progress to the rightful account owner to confirm their authorization to register said local/mobile computing device to said validation database. This communication between said validation database server/web server and the rightful account owner is done electronically via email or text or may be done physically by voice communication or physical mail.

If validation database server/Web server receives a positive confirmation of said local/mobile computing device from the rightful account holder, said second software program removes said secured specified distinctive identifiers from a quarantined/escrowed status.

Said second software program recognizes the flag inserted by said first software program that identifies said submittal as a new registration of said local/mobile computing device, and prepares said values for insertion into said validation database maintained on said validation database server/Web server.

Based on the positive confirmation notice received from the rightful account owner, said second software program removes said specified distinctive identifiers from quarantined/escrowed status and inserts said values into said validation database.

Upon successful insertion of said specified distinctive identifiers into said validation database by said second software program, said second software program may notify the rightful account owner of the successful completion of the registration of said requested local/mobile computing device into said validation database.

In the event that said second software program residing on said validation database server/web server does not receive a positive confirmation of the registration attempt from the rightful account owner, said validation database server/Web server will electronically notify said second software program of this denial.

Based on this denial notice, said second software program will remove said specified distinctive identifiers from quarantined/escrowed status and will securely erase said values.

In another preferred embodiment of the non-escrow registration method of this invention, a rightful account owner makes a request to, or is required by a transaction certifying authority to register a local/mobile computing device in a validation database residing in a validation database server/Web server in order that the unique identity of said local/mobile computing device may be used as a digital hardware key for authorization and access.

A first software program is then electronically downloaded from the transaction certifying authority to the rightful account owner's local/mobile computing device. Said first software program then executes on said local/mobile computing device and manages the collection of said specified distinctive identifiers from said local/mobile computing device.

Said first software program collects a defined set of hardware and/or software identifiers drawn from said local/mobile computing device known and approved by the rightful owner of the account. The purpose of this process is to provide a baseline registration for validating the identity of said local/mobile computing device in relation to a transaction seeking a confirmation of the identity of a local/mobile computing device.

Said first software program, recognizing that the collection of said specified distinctive identifiers is intended as an initial registration of the identity of said local/mobile computing device, flags said values as an initial registration.

The specified distinctive identifiers collected by said first software program during this initial registration process are based on specified distinctive hardware components of said local/mobile computing device, as well as specified distinctive software identifiers from said local/mobile computing device. In addition, the registration process may include a unique string of data, such as a password and/or a biometric marker that is entered by the rightful owner of the account and/or a unique identification number of said first software program, which may also become part of said specified distinctive identifiers that are collected during the registration process.

Once the first software program has executed and said specified distinctive identifiers have been collected, said first software program will process said specified distinctive identifiers by securing them prior to electronic transmission to the transaction certifying authority. Said first software program may also perform a hashing operation on said specified distinctive identifiers prior to encrypting them for electronic transmission.

When said first software program has completed securing said specified distinctive identifiers it will then electronically transmit said secured data to the transaction certifying authority that issued said first software program to said local/mobile computing device.

After transmitting said secured specified distinctive identifiers said first software program may remain resident in the memory/storage of said local/mobile computing device or resident in the web browser of said local/mobile computing device or may dissolve and no longer be resident on said local/mobile computing device upon completion of transmission of said secured specified distinctive identifiers.

Once the secured data has been electronically transmitted to the transaction certifying authority, said first software program will insure that no trace of said collected specified distinctive identifiers is retained within said local/mobile computing device. Memory used for the calculations, securing and maintaining of the resulting data (hashed/encrypted/both) is securely erased.

Said secured specific distinctive identifiers are received electronically by the transaction certifying authority.

Transaction certifying authority will then electronically transmit said secured specified distinctive identifiers to said validation database server/Web server. Transaction certifying authority will insure that no trace of said secured specific distinctive identifiers is retained by the transaction certifying authority.

Said secured specific distinctive identifiers electronically transmitted by the transaction certifying authority are received by said second software program executing on said validation database server/Web server.

Said second software program recognizes the flag inserted by said first software program that identifies said submittal as a new registration of a local/mobile computing device, prepares said identity for insertion into said validation database file maintained on said validation database server/Web server.

Said specified distinctive identifiers are then inserted by said second software program into said validation database residing on said validation database server/Web server.

Upon successful insertion of said specified distinctive identifiers into said validation database, said second software program notifies the transaction certifying authority that the insertion of said specified distinctive identifiers has been successfully completed.

Upon receiving notification by said second software program of successful insertion of said specified distinctive identifiers into said validation database, transaction certifying authority may, at their discretion, notify the rightful account owner of the successful completion of the registration of the requested local/mobile computing device into said validation database.

In another preferred embodiment of the escrowed registration method of this invention, a rightful account owner makes a request to, or is required by a transaction certifying authority to register a local/mobile computing device in a validation database resident on a validation database server/Web server in order that the unique identity said local/mobile computing device may be used as a digital hardware key for authorization and access.

A first software program is then electronically downloaded from said transaction certifying authority to the rightful account owners said local/mobile computing device. Said first software program then executes on said local/mobile computing device and manages the collection of specified distinctive identifiers from said local/mobile computing device.

Said first software program collects a defined set of hardware and/or software identifiers drawn from said local/mobile computing device known and approved by the rightful owner of the account. The purpose of this process is to provide a baseline registration for validating the identity of said local/mobile computing device in relation to a later transaction seeking a validation of the identity of a local/mobile computing device.

Said first software program, recognizing that the collection of said specified distinctive identifiers is intended as an initial registration of the unique identity of said local/mobile computing device, flags said values as an initial registration.

Said specified distinctive identifiers collected by said first software program during this initial registration process are based on specified distinctive hardware components of said local/mobile computing device, as well as specified distinctive software identifiers from said local/mobile computing device. In addition, the registration process may include a unique string of data, such as a password and/or a biometric marker that is entered by the rightful owner of the account and/or a unique identification number of said first software program, which may also become part of said specified distinctive identifiers that are collected during the registration process.

Once said first software program has executed and said specified distinctive identifiers have been collected, said first software program will process said specified distinctive identifiers by securing them prior to electronic transmission to said transaction certifying authority. Said first software program may also perform a hashing operation on said specified distinctive identifiers prior to encrypting them for electronic transmission.

When said first software program has completed securing said specified distinctive identifiers it will then electronically transmit said secured data to said transaction certifying authority that issued said first software program to said local/mobile computing device.

After transmitting said secured specified distinctive identifiers said first software program may remain resident in the memory/storage of said local/mobile computing device or resident in the web browser of said local/mobile computing device or may dissolve and no longer be resident at all on said local/mobile computing device upon completion of transmission of said secured specified distinctive identifiers.

Once the secured data has been electronically transmitted to said transaction certifying authority, said first software program will insure that no trace of said collected specified distinctive identifiers is retained within said local/mobile computing device. Memory used for the calculations, securing and maintaining of the resulting data (hashed/encrypted/both) is securely erased.

Said secured specific distinctive identifiers are received electronically by the transaction certifying authority.

Transaction certifying authority will then electronically transmit said secured specified distinctive identifiers to said validation database server/Web server. Transaction certifying authority will insure that no trace of said secured specific distinctive identifiers is retained by the transaction certifying authority.

Said secured specific distinctive identifiers generated by said first software program are received electronically by a second software program residing on a validation database server/Web server.

Said second software program determines if said specified distinctive identifiers should be assigned an escrow/quarantine status prior to insertion into said validation database and if said status is applied, continue to escrow/quarantine said secured specified distinctive identifiers until receiving an approval to release from said transaction certifying authority that submitted the specified distinctive identifiers.

Said validation database server/website will send a confirmation notice of said local/mobile device registration progress to the transaction certifying authority, which in turn will ask the rightful account owner to confirm their authorization to register said local/mobile computing device to said validation database. This communication between said certifying authority and the rightful account owner is done electronically via email or text or may be done physically by voice communication or physical mail.

If validation database server/Web server receives a positive approval to add the specified distinctive identifiers from said transaction certifying authority, said second software program removes said secured specified distinctive identifiers from a quarantined/escrowed status.

Based on the positive confirmation notice received from the transaction certifying authority, said second software program removes said specified distinctive identifiers from quarantined/escrowed status and inserts said values into said validation database.

Upon successful insertion of said specified distinctive identifiers into said validation database by said second software program, said second software program may notify the transaction certifying authority of the successful completion of the registration of said requested specified distinctive identifiers into said validation database.

In the event that the transaction certifying authority does not receive a positive response from the rightful account owner with regard to the registration of this device into said validation database, the transaction certifying authority will electronically notify said second software program of this denial of approval.

Based on this denial notice, said second software program will remove said specified distinctive identifiers from quarantined/escrowed status and will securely erase said values.

In a preferred embodiment of the transactional method of use of this invention in a card not present e-Commerce financial transaction, upon completing the registration of a local/mobile computing device in a validation database residing on a validation database server/Web server, the rightful owner of the account can use said registered local/mobile computing device as a digital hardware validation key in the authorization process of a card not present e-Commerce credit/debit/bank account transaction.

As part of the card not present e-Commerce financial transaction authorization process, the local/mobile computing device will generate a transaction request to the e-Commerce website involved in the transaction.

Upon receiving the transaction request, said e-Commerce website will generate a transaction request to the transaction certifying authority responsible for said transaction.

Responsible transaction certifying authority will determine if the account being used in this transaction requires validation of said local/mobile computing device based on records maintained by said transaction certifying authority. If transaction certifying authority determines that validation of a local mobile computing device is required a request to execute first software program is sent to the e-Commerce website.

The e-Commerce website, upon receiving the request to execute first software program from said certifying authority, forwards said execution request to the first software program residing on said local/mobile computing device being used to initiate the transaction.

First software program receives said execution request with instructions to regenerate said specified distinctive identifiers and then executes on said local/mobile computing device and manages the collection of said specified distinctive identifiers from said local/mobile computing device.

Said first software program collects a specified set of hardware and/or software identifiers drawn from said local/mobile computing device Said first software program, recognizing that the collection of said specified distinctive identifiers is intended as a regeneration of said specified distinctive identifiers of said local/mobile computing device, flags said collected values as regenerated values.

Said specified distinctive identifiers collected by said first software program during this regeneration process are based on said specified distinctive hardware components of said local/mobile computing device, as well as specified distinctive software identifiers from said local/mobile computing device. In addition, the regeneration process may include a unique string of data, such as a password and/or a biometric marker that is entered by the rightful owner of the account and/or a unique identification number of said first software program, which may also become part of said specified distinctive identifiers that are collected during the regeneration process.

Once the first software program has executed and said specified distinctive identifiers have been collected, said first software program will process said specified distinctive identifiers by securing them prior to electronic transmission to the e-Commerce website. Said first software program may also perform a hashing operation on said specified distinctive identifiers prior to encrypting them for electronic transmission.

When said first software program has completed securing said regenerated specified distinctive identifiers it will then electronically transmit said secured data to the e-Commerce website.

Once the secured data has been electronically transmitted to the e-Commerce website, said first software program will insure that no trace of said regenerated specified distinctive identifiers is retained within said local/mobile computing device. Memory used for the calculations, securing and maintaining of the resulting data (hashed/encrypted/both) is securely erased.

Said regenerated and secured specific distinctive identifiers are received electronically by the e-Commerce website.

When e-Commerce website receives said regenerated specified distinctive identifiers from the first software program, it then forwards the regenerated specified distinctive identifiers to the responsible transaction certifying authority that issued the validation request.

Once the regenerated specified distinctive identifiers have been electronically transmitted to the responsible transaction certifying authority, said e-Commerce website will insure that no trace of said regenerated specified distinctive identifiers is retained on e-Commerce website.

Transaction certifying authority receives the regenerated specified distinctive identifiers from the e-Commerce website.

Transaction certifying authority will then electronically transmit the regenerated specified distinctive identifiers to the second software program residing on the validation database server/Web server.

Transaction certifying authority will insure that no trace of said regenerated secured specific distinctive identifiers is retained by the transaction certifying authority.

Said secured regenerated specified distinctive identifiers and the validation request are electronically transmitted by the transaction certifying authority and are received by said second software program residing on said validation database server/Web server.

Said second software program recognizes the flag inserted by said first software program that identifies said submittal as a regeneration of specified distinctive identifiers from a local/mobile computing device.

Said second software program prepares the regenerated specified distinctive identifiers and processes the validation request.

Said second software program performs a validation function by matching the regenerated specific distinctive identifiers received from the transaction certifying authority to the inventory of specified distinctive identifiers previously registered in said validation database residing on said validation database server/Web server.

Said second software program determines if the regenerated specified identifiers matched against said specified distinctive identifiers previously registered in the validation database meet the level of compliance required to validate this transaction.

If said second software program determines that the regenerated specified distinctive identifiers meet the level of compliance required to validate this transaction, a positive match result notification is electronically sent to the transaction certifying authority that initiated the validation request.

Upon completion of the electronic transmission of the positive match result, said second software program will securely erase said regenerated specified distinctive identifiers.

Transaction certifying authority, upon receiving the positive validation match notification may, at their discretion and dependent on other personal/credit information they posses, authorize or decline the requested e-Commerce transaction.

If said second software program determines that the regenerated specified distinctive identifiers do not meet the level of compliance required to validate this transaction, a negative match result notification is electronically sent to the transaction certifying authority that initiated the validation request.

Upon completion of the electronic transmission of the negative match result, said second software program will securely erase said regenerated specified distinctive identifiers.

Transaction certifying authority, upon receiving the negative validation match result notification may, at their discretion and dependent on other personal/credit information they posses, authorize or decline the requested e-Commerce transaction via notification to the e-Commerce website.

In another preferred embodiment of the transactional method of use of this invention in a card present financial transaction, once the registration of a local/mobile computing device in a validation database residing on a validation database server/Web server has been satisfactorily completed, the rightful owner of the account can use said registered local/mobile computing device as a digital hardware validation key in gaining authorization of a card present credit/debit card transaction or a paper check bank account transaction.

As part of the card present financial transaction authorization process, the physical use of the account card or paper check causes the Point of Sale (POS) or Automated Teller Machine (ATM) terminal involved in the transaction to generate a transaction request to the transaction certifying authority responsible for that transaction.

Responsible transaction certifying authority will determine if the account being used in this transaction requires validation of a local/mobile computing device based on records maintained by said transaction certifying authority. If transaction certifying authority determines that validation of a local mobile computing device is required, a execute first software program is sent to the POS/ATM terminal that initiated the transaction.

Upon receiving the execute first software program instruction from said transaction certifying authority, the POS/ATM terminal establishes a wireless connection to said local/mobile computing device present at the physical location of the transaction initiation, and said wireless connection is established via a number of wireless methods, including but not limited to, Near Field Communication (NFC), Bluetooth or a Wireless interface.

The Point of Sale (POS) or Automated Teller Machine (ATM) terminal, upon receiving the execute first software program instruction and establishing wireless communications with said local/mobile computing device, wirelessly forwards said request to execute too the first software program residing on said local/mobile computing device present at the physical point of transaction.

First software program residing on the local/mobile computing device receives the validation request with instructions to regenerate said specified distinctive identifiers and then executes on said local/mobile computing device and manages the collection of said regenerated specified distinctive identifiers from said local/mobile computing device.

Said first software program collects a specified set of hardware and/or software identifiers drawn from said local/mobile computing device.

Said first software program, recognizing that the collection of said specified distinctive identifiers is intended as a regeneration of said specified distinctive identifiers of said local/mobile computing device, flags said collected values as regenerated values.

Said specified distinctive identifiers collected by said first software program during this regeneration process are based on said specified distinctive hardware components of said local/mobile computing device, as well as specified distinctive software identifiers from said local/mobile computing device. In addition, the regeneration process may include a unique string of data, such as a password and/or a biometric marker that is entered by the rightful owner of the account and/or a unique identification number of said first software program, which may also become part of said specified distinctive identifiers that are collected during the regeneration process.

Once the first software program has executed and said regenerated specified distinctive identifiers have been collected, said first software program will process said regenerated specified distinctive identifiers by securing them prior to electronic transmission to the POS/ATM terminal. Said first software program may also perform a hashing operation on said specified distinctive identifiers prior to encrypting them for electronic transmission.

When said first software program has completed securing said regenerated specified distinctive identifiers it will then electronically transmit said secured data to the POS/ATM terminal via the communications link that was earlier established between the POS/ATM terminal and said local/mobile computing device.

Once the secured data has been electronically transmitted to the POS/ATM terminal, said first software program will insure that no trace of said regenerated specified distinctive identifiers is retained within said local/mobile computing device. Memory used for the calculations, securing and maintaining of the resulting data (hashed/encrypted/both) is securely erased.

Once the POS/ATM terminal has received the regenerated specified distinctive identifiers they will be electronically sent to the transaction certifying authority that initiated the validation request.

Said regenerated and secured specific distinctive identifiers are received electronically by the transaction certifying authority.

Transaction certifying authority will then electronically transmit a validation request and said regenerated secured specified distinctive identifiers to said second software program executing on said validation database server/Web server.

Transaction certifying authority will insure that no trace of said regenerated secured specific distinctive identifiers is retained by the transaction certifying authority.

Said regenerated secured specific distinctive identifiers and the validation request electronically transmitted by the transaction certifying authority are received by said second software program residing on said validation database server/Web server.

Said second software program recognizes the flag inserted by said first software program that identifies said submittal as a regeneration of specified distinctive identifiers from a local/mobile computing device.

Said second software program performs a validation matching function of the regenerated specific distinctive identifiers received as part of the validation request from the transaction certifying authority to the inventory of specified distinctive identifiers previously registered in said validation database residing on said validation database server/Web server.

Said second software program determines if the regenerated specified identifiers matched against said specified distinctive identifiers previously registered in the validation database meet the level of compliance required to validate this transaction.

If said second software program determines that the regenerated specified distinctive identifiers meet the level of compliance required to validate this transaction, a positive match result notification is electronically sent to the transaction certifying authority that initiated the validation request.

Upon completion of the electronic transmission of the positive validation match result, said second software program will securely erase said regenerated specified distinctive identifiers.

Transaction certifying authority, upon receiving the positive validation match notification may, at their discretion and dependent on other personal/credit information they posses, authorize or decline the requested transaction.

If said second software program determines that the regenerated specified distinctive identifiers do not meet the level of compliance required to validate this transaction, a negative validation match result notification is electronically sent to the transaction certifying authority that initiated the validation request.

Upon completion of the electronic transmission of the negative validation match result, said second software program will securely erase said regenerated specified distinctive identifiers.

Transaction certifying authority, upon receiving the negative validation match result notification may, at their discretion and dependent on other personal/credit information they posses, authorize or decline the requested transaction.

In another preferred embodiment of the transactional method of use of this invention in gaining access to a website account, once the registration of a local/mobile computing device in a validation database residing on a validation database server/Web server has been satisfactorily completed, the rightful owner of the account can use said registered local/mobile computing device as a digital hardware key in gaining right of website account access with participating websites.

As part of the website account access authorization process, a local/mobile computing device will request access from the participating website, which is acting as the transaction certifying authority.

Participating website, acting as a transaction certifying authority, will determine if the account being accessed in this access request requires validation of a local/mobile computing device based on records maintained by said participating website, acting as a transaction certifying authority. If participating website, acting as a transaction certifying authority, determines that validation of a local mobile computing device is required, a request to execute first software program is sent to said first software program residing on said local/mobile computing device that initiated the access request with a flag to regenerate said specified distinctive identifiers from said local/mobile computing device.

First software program receives the execution request with instructions to regenerate said specified distinctive identifiers and then executes on said local/mobile computing device and manages the collection of said regenerated specified distinctive identifiers from said local/mobile computing device.

Said first software program collects a specified set of hardware and/or software identifiers drawn from said local/mobile computing device.

Said first software program, recognizing that the collection of said specified distinctive identifiers is intended as a regeneration of said specified distinctive identifiers of said local/mobile computing device, flags said values as regenerated values.

Said regenerated specified distinctive identifiers collected by said first software program during this regeneration process are based on said specified distinctive hardware components of said local/mobile computing device, as well as specified distinctive software identifiers from said local/mobile computing device. In addition, the regeneration process may include a unique string of data, such as a password and/or a biometric marker that is entered by the rightful owner of the account and/or a unique identification number of said first software program, which may also become part of said specified distinctive identifiers that are collected during the regeneration process.

Once the first software program has executed and said regenerated specified distinctive identifiers have been collected, said first software program will process said regenerated specified distinctive identifiers by securing them prior to electronic transmission to the transaction certifying authority. Said first software program may also perform a hashing operation on said regenerated specified distinctive identifiers prior to encrypting them for electronic transmission.

When said first software program has completed securing said regenerated specified distinctive identifiers it will then electronically transmit said secured data to the participating website, acting as the transaction certifying authority, that requested the regeneration process to said local/mobile computing device.

Once the secured data has been electronically transmitted to the participating website, said first software program will insure that no trace of said regenerated specified distinctive identifiers is retained within said local/mobile computing device. Memory used for the calculations, securing and maintaining of the resulting data (hashed/encrypted/both) is securely erased.

Said regenerated and secured specific distinctive identifiers are received electronically by the participating website, acting as the transaction certifying authority.

Participating website, acting as the transaction certifying authority, will then electronically transmit a validation request and said regenerated secured specified distinctive identifiers to said second software program executing on said validation database server/Web server.

Participating website will insure that no trace of said regenerated secured specific distinctive identifiers is retained by the participating website.

Said regenerated secured specific distinctive identifiers and the validation request electronically transmitted by the participating website acting as the transaction certifying authority are received by said second software program resident on said validation database server/Web server.

Said second software program recognizes the flag inserted by said first software program that identifies said submittal as a regeneration of specified distinctive identifiers from a local/mobile computing device.

Said second software program performs a validation matching function of the regenerated specific distinctive identifiers received as part of the validation request from the transaction certifying authority to the inventory of specified distinctive identifiers previously registered in said validation database residing on said validation database server/Web server.

Said second software program determines if the regenerated specified identifiers matched against said specified distinctive identifiers previously registered in the validation database meet the level of compliance required to validate this access transaction.

If said second software program determines that the regenerated specified distinctive identifiers meet the level of compliance required for validation of this transaction, a positive validation match result notification is electronically sent to the participating website acting as the transaction certifying authority that initiated the validation request.

Upon completion of the electronic transmission of the positive validation match result, said second software program will securely erase said regenerated specified distinctive identifiers.

Participating website, upon receiving the positive validation match notification may, at their discretion and dependent on other information they posses, authorize or decline the requested transaction.

If said second software program determines that the regenerated specified distinctive identifiers do not meet the level of compliance required to validate this transaction, a negative validation match result notification is electronically sent to the participating website acting as the transaction certifying authority that initiated the validation request.

Upon completion of the electronic transmission of the negative validation match result, said second software program will securely erase said regenerated specified distinctive identifiers.

Participating website acting as the transaction certifying authority, upon receiving the negative validation match result notification may, at their discretion and dependent on other information they posses, authorize or decline the requested transaction.

In another preferred embodiment of the transactional method of use of this invention in gaining access to local applications, operating systems or secured files, once the registration of a local/mobile computing device in a validation database residing on a validation database server/Web server has been satisfactorily completed, the rightful owner of the account can use said registered local/mobile computing device as a digital hardware key in gaining right of access to software applications, operating systems and encrypted data, hereby know as "specified applications" that reside on the local/mobile computing device.

The specified application residing on the local/mobile computing device will request access from the appropriate transaction certifying authority.

Transaction certifying authority, will determine if the application, operating system or secure files being accessed in this request requires validation of a local/mobile computing device based on records maintained by said transaction certifying authority. If transaction certifying authority, determines that validation of a local mobile computing device is required, a request to execute first software program is sent to said first software program residing on said local/mobile computing device that initiated the access request with a flag to regenerate the specified distinctive identifiers from said local/mobile computing device.

First software program may be resident on the local/mobile computing device as either a stand-alone application or may be embedded within a specified application, also resident on the local/mobile computing device.

First software program receives the execute request with instructions to regenerate said specified distinctive identifiers and then executes on said local/mobile computing device and manages the collection of said regenerated specified distinctive identifiers from said local/mobile computing device.

Said first software program collects a specified set of hardware and/or software identifiers drawn from said local/mobile computing device known and approved by the rightful owner of the account.

Said first software program, recognizing that the collection of said specified distinctive identifiers is intended as a regeneration of said specified distinctive identifiers of said local/mobile computing device, flags said values as regenerated values.

Said specified distinctive identifiers collected by said first software program during this regeneration process are based on said specified distinctive hardware components of said local/mobile computing device, as well as specified distinctive software identifiers from said local/mobile computing device. In addition, the regeneration process may include a unique string of data, such as a password and/or a biometric marker that is entered by the rightful owner of the account and/or a unique identification number of said first software program, which may also become part of said specified distinctive identifiers that are collected during the regeneration process.

Once the first software program has executed and said regenerated specified distinctive identifiers have been collected, said first software program will process said regenerated specified distinctive identifiers by securing them prior to electronic transmission to the transaction certifying authority. Said first software program may also perform a hashing operation on said specified distinctive identifiers prior to encrypting them for electronic transmission.

When said first software program has completed securing said regenerated specified distinctive identifiers it will then electronically transmit said secured data to the transaction certifying authority.

Once the secured data has been electronically transmitted to the transaction certifying authority said first software program will insure that no trace of said regenerated specified distinctive identifiers is retained by first software program. Memory used for the calculations, securing and maintaining of the resulting data (hashed/encrypted/both) is securely erased.

Said regenerated and secured specific distinctive identifiers are received electronically by the transaction certifying authority.

Transaction certifying authority will then electronically transmit a validation request and said regenerated secured specified distinctive identifiers to said second software program executing on said validation database server/Web server.

Transaction certifying authority will insure that no trace of said regenerated secured specific distinctive identifiers is retained within the transaction certifying authority.

Said regenerated secured specific distinctive identifiers and the validation request electronically transmitted by the transaction certifying authority are received by said second software program executing on said validation database server/Web server.

Said second software program recognizes the flag inserted by said first software program that identifies said submittal as a regeneration of specified distinctive identifiers from a local/mobile computing device.

Said second software program performs a matching function of the regenerated specific distinctive identifiers received as part of the validation request from the specified application acting as the transaction certifying authority to the inventory of specified distinctive identifiers previously registered in said validation database residing on said validation database server/Web server.

Said second software program determines if the regenerated specified identifiers matched against said specified distinctive identifiers previously registered in the validation database meet the level of compliance required to validate this access transaction.

If said second software program determines that the regenerated specified distinctive identifiers meet the level of compliance required to validate this access transaction, a positive validation match result notification is electronically sent to transaction certifying authority that initiated the validation request to the second software program.

Upon completion of the electronic transmission of the positive validation match result, said second software program will securely erase said regenerated specified distinctive identifiers.

Transaction certifying authority upon receiving the positive validation match notification may, at its discretion and dependent on other information it posses, authorize or decline the requested transaction.

If said second software program determines that the regenerated specified distinctive identifiers do not meet the level of compliance required to validate this transaction, a negative validation match result notification is electronically sent to the transaction certifying authority that initiated the validation request.

Upon completion of the electronic transmission of the negative validation match result, said second software program will securely erase said regenerated specified distinctive identifiers.

Transaction certifying authority upon receiving the negative validation match result notification may, at their discretion and dependent on other information it posses, authorize or decline the access request.

In another preferred embodiment of the transactional method of use of this invention in gaining access to physical spaces and things, once the registration of a local/mobile computing device in a validation database residing on a validation database server/Web server has been satisfactorily completed, the authorized person of the spaces or things can use said registered local/mobile computing device as a digital hardware key in gaining right of access to secured spaces and things.

As part of a physical access to spaces and things process, said local/mobile computing device will wirelessly request access to the network connected securing mechanism, which is acting as a transaction certifying authority.

Network connected securing mechanism, which is acting as a transaction certifying authority, will determine if the physical spaces or things subject to this access request requires validation of a local/mobile computing device based on records maintained by said transaction certifying authority. If network connected securing mechanism, acting as a transaction certifying authority, determines that validation of a local mobile computing device is required, a request to execute first software program is sent to said first software program residing on the local/mobile computing device that initiated the access request with a flag to regenerate said specified distinctive identifiers from said local/mobile computing device.

Communication between the network connected securing mechanism acting as the transaction certifying authority and the local/mobile computing device may be established via a number of modes, including but not limited to, Near Field Communication (NFC), Bluetooth or a Wireless interface.

First software program receives the execute request with instructions to regenerate said specified distinctive identifiers and then executes on said local/mobile computing device and manages the collection of said regenerated specified distinctive identifiers from said local/mobile computing device.

Said first software program collects a specified set of hardware and/or software identifiers drawn from said local/mobile computing device.

Said first software program, recognizing that the collection of said specified distinctive identifiers is intended as a regeneration of said specified distinctive identifiers of said local/mobile computing device, flags said values as regenerated values.

Said specified distinctive identifiers collected by said first software program during this regeneration process are based on said specified distinctive hardware components of said local/mobile computing device, as well as specified distinctive software identifiers from said local/mobile computing device. In addition, the regeneration process may include a unique string of data, such as a password and/or a biometric marker that is entered by the rightful owner of the account and/or a unique identification number of said first software program, which may also become part of said specified distinctive identifiers that are collected during the regeneration process.

Once the first software program has executed and said regenerated specified distinctive identifiers have been collected, said first software program will process said regenerated specified distinctive identifiers by securing them prior to electronic transmission to the network connected securing mechanism acting as the transaction certifying authority. Said first software program may also perform a hashing operation on said regenerated specified distinctive identifiers prior to encrypting them for electronic transmission.

When said first software program has completed securing said regenerated specified distinctive identifiers it will then electronically transmit said regenerated secured data to the network connected securing mechanism acting as the transaction certifying authority, via the communications link that was earlier established between said network connected securing mechanism acting as the transaction certifying authority and said local/mobile computing device.

Once said secured data has been electronically transmitted to the network connected securing mechanism acting as the transaction certifying authority, said first software program will insure that no trace of said regenerated specified distinctive identifiers is retained within said local/mobile computing device. Memory used for the calculations, securing and maintaining of the resulting data (hashed/encrypted/both) is securely erased.

Said regenerated and secured specific distinctive identifiers are received electronically by the network connected securing mechanism acting as the transaction certifying authority.

Network connected securing mechanism acting as the transaction certifying authority will then electronically transmit a validation request and said regenerated secured specified distinctive identifiers to said second software program executing on said validation database server/Web server.

Network connected securing mechanism acting as the transaction certifying authority will insure that no trace of said regenerated secured specific distinctive identifiers is retained by the network connected securing mechanism acting as the transaction certifying authority.

Said regenerated secured specific distinctive identifiers and the validation request electronically transmitted by the network connected securing mechanism acting as the transaction certifying authority, are received by said second software program executing on said validation database server/Web server.

Said second software program recognizes the flag inserted by said first software program that identifies said submittal as a regeneration of specified distinctive identifiers from a local/mobile computing device.

Said second software program performs a matching function of the regenerated specific distinctive identifiers received as part of the validation request from the network connected securing mechanism acting as the transaction certifying authority, to the inventory of specified distinctive identifiers previously registered in said validation database residing on said validation database server/Web server.

Said second software program determines if the regenerated specified identifiers matched against said specified distinctive identifiers previously registered in the validation database meet the level of compliance required to validate this access.

If said second software program determines that the regenerated specified distinctive identifiers meet the level of compliance required to validate this access, a positive validation match result notification is electronically sent to the network connected securing mechanism acting as the transaction certifying authority that initiated the validation request.

Upon completion of the electronic transmission of the positive validation match result, said second software program will securely erase said regenerated specified distinctive identifiers.

Network connected securing mechanism acting as the transaction certifying authority, upon receiving the positive validation match notification may, at their discretion and dependent on other information or requirements they may impose, authorize or decline the requested access.

If said second software program determines that the regenerated specified distinctive identifiers do not meet the level of compliance required to validate this transaction, a negative match result notification is electronically sent to the network connected securing mechanism acting as the transaction certifying authority that initiated the validation request.

Upon completion of the electronic transmission of the negative validation match result, said second software program will securely erase said regenerated specified distinctive identifiers.

Network connected securing mechanism acting as the transaction certifying authority, upon receiving the negative validation match result notification may, at their discretion and dependent on other information it posses, authorize or decline the requested access.

Now referencing FIG. 1 where 10 is a depiction of two hash values whose input alphanumeric strings are "password" (for hash 12) and "password" (for hash 14). Note that the difference between the inputs is a "space" character. These hash examples were generated using the SHA-3 hashing algorithm. NIST® (National Institute of Standards and Technology®) has updated Draft FIPS Publication 202, SHA-3 Standard separate from the Secure Hash Standard (SHS). Note that with a addition of a single character " " to the first input string "password" the resulting hash value (hash 14) is completely different.

Figure 2A:
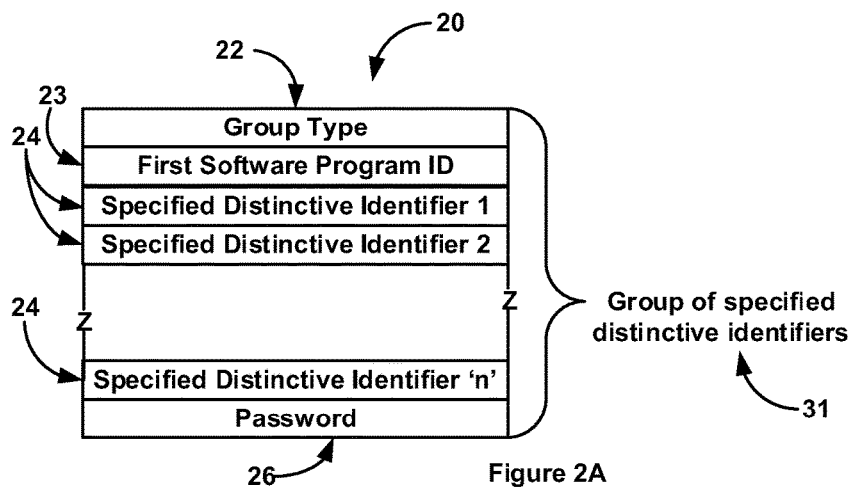
FIG. 2A is a depiction of a group of distinctive identifiers.

Now referencing FIG. 2A where 20 depicts a group of specified distinctive identifiers. In this depiction, the distinctive identifiers may be hashed or in clear text. In this depiction, group of distinctive identifiers 31 is comprised of group type 22, first software program ID 23, specified distinctive identifier 1-'n' (24) and password 26. In this depiction, group type 22 contains a value that identifies group of distinctive identifiers 31 as initial specific distinctive identifiers or as regenerated specific distinctive identifiers. Group type 22 is used by second software program 124 residing on validation database server/website 104. First software program ID 23 is used as an additional distinctive identifier by second software program 134 and is assigned by transaction certifying authority 202 or by validation database server/website 104 to all devices owned by the user when they are initially registered. This allows transaction certifying authority 202, in a different embodiment, to locate archived entries belonging to the user. Validation database server/website 104 will use group type 22 to decide if group of distinctive identifiers 31 are to be archived in the validation database or be matched to an existing group of specified distinctive identifiers. Password 26 will be solicited from the user (not shown in the drawings) and included in group of distinctive identifiers 31 and may be hashed or in clear text.

Figure 2B:
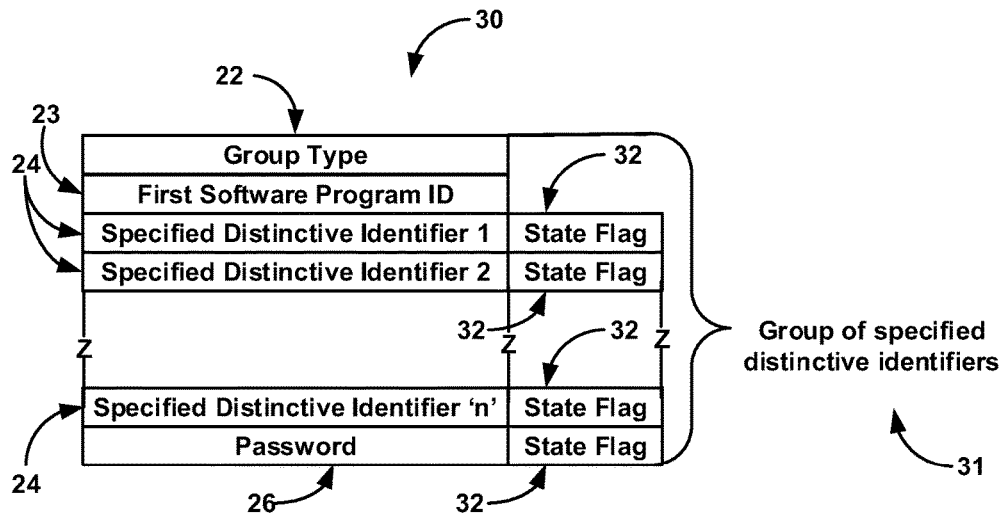
FIG. 2B is a depiction of a group of distinctive identifiers with the addition of a state flags.

Now referencing FIG. 2B where 30 depicts a group of specified distinctive identifiers 31. In this depiction, each of the depicted specified distinctive identifiers 1-'n' have a state flag 32 attached. In this depiction, state flag 32 contains a value that identifies its associated specified distinctive identifier 24 that it must either match the group of distinctive identifiers already archived in the validation database or that it may be ignored. Some certifying authorities may allow for one or more specified distinctive identifiers 24 to be different than those already archived due to changes in the hardware or software modules residing in local/mobile computing device 102.

Figure 2C:
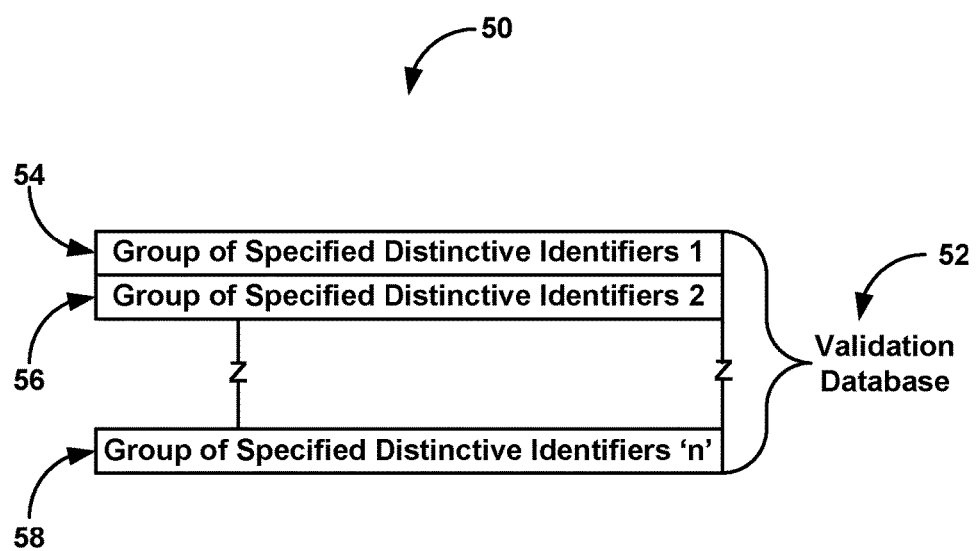
FIG. 2C shows a depiction of a validation database.

Now referencing FIG. 2C where 50 depicts validation database 52. Validation database 52 contains 'n' records (54, 56, and 58) of group of specified distinctive identifier 31. Validation database may be any database type where individual database records (groups of specified distinctive identifiers 31 may be inserted, sorted, matched. Validation database may be a SQL type database or a flat file database or a random access database.

Figure 3:
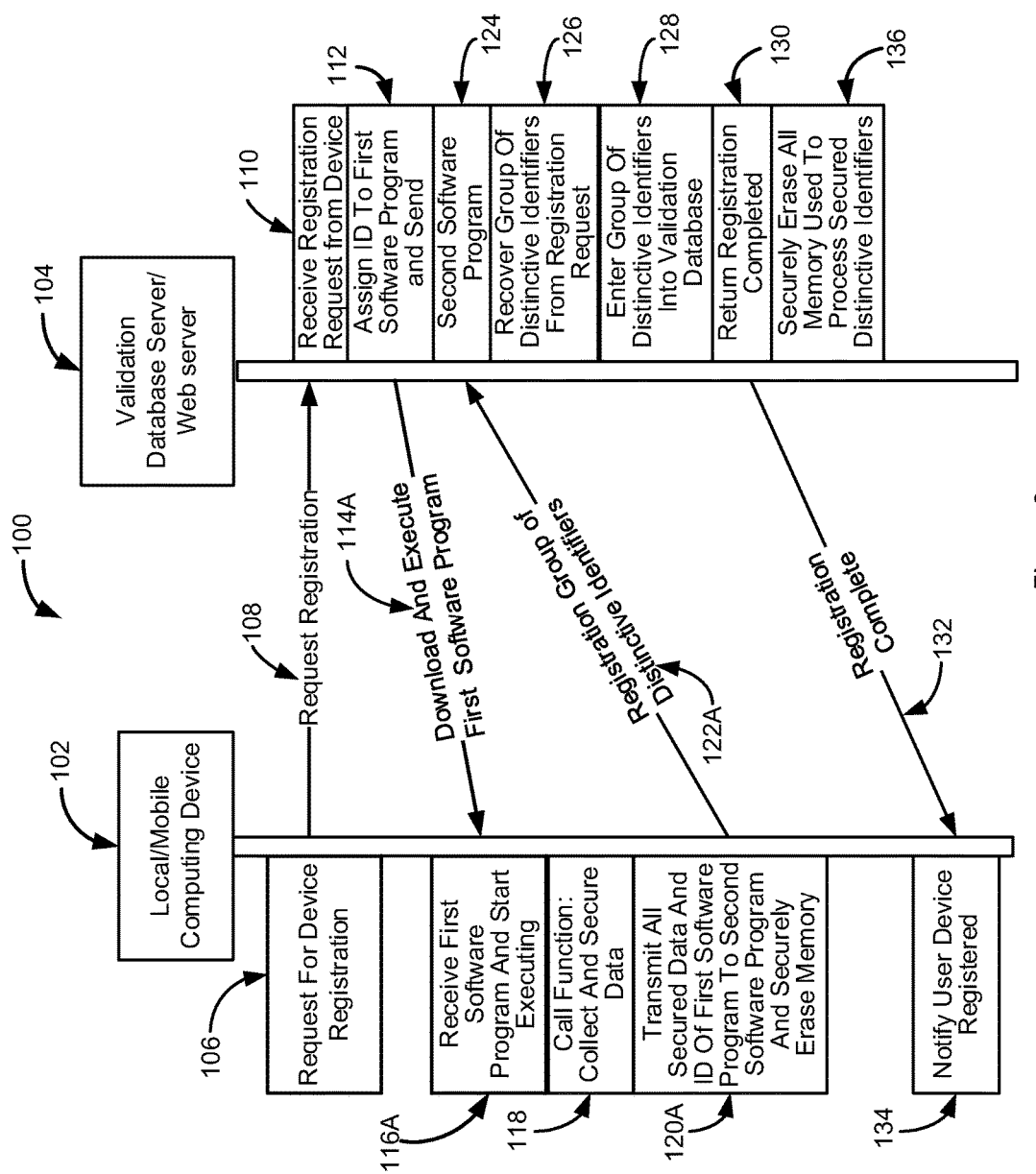
FIG. 3 is a depiction of a method of directly registering specified distinctive identifiers drawn from a local/mobile computing device, to a validation database residing on a validation server and whereby the registration values are not escrowed prior to being entered into said validation database.

Now referencing FIG. 3 where 100 depicts local/mobile computing device 102 which may be a user's desktop computer, tablet computer, PDA, or smart cellular phone and validation database server/website 104 which is a network resident server site where the validation database 52 resides. This figure depicts the registration of local/mobile computing device 102 with the validation database server 104 where group of distinctive identifiers 31 is entered into the validation database 52.

Processing for this depiction begins at request processing bock 106 request for device registration. This processing block makes the assumption that this is the initial registration for local/mobile computing device 102 and that first software program is not resident on local/mobile computing device 102 and needs to be downloaded. Processing block 106 sends signal 108 request registration to validation database server/website 104 receive processing block 110 receive registration request from device.

Processing block 110 receives signal 108 and falls through to assign processing block 112 assign ID to first software program and send. This processing block assigns a unique ID to first software program (not shown) that may associate first software program to an individual user account. This processing block then sends signal 114A download and execute first software program to receive processing block 116A receive first software program and start execution.

Processing block 116A receives first software program and saves it to local/mobile computing device storage memory (not shown). Once first software program has been stored it is placed into execution at call function processing block 118 call function: collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120A transmit all secured data and ID of first software program to second software program and securely erase memory. Processing block 120A transmits group of distinctive identifiers 31 as signal 122A registration group of distinctive identifiers to second software program 124 residing in validation database server/website 104 then securely erases any memory locations in local/mobile computing device 102 that were used to construct group of distinctive identifiers 31.

Processing block 124 manages the archiving of group of distinctive identifiers 31 in validation database 52. Once second software program 124 receives signal 122A registration group of distinctive identifiers, control will fall through to recover processing block 126 recover group of distinctive identifiers from registration request.

Processing block 126 will, if registration group of distinctive identifiers 122A was encrypted prior to transmission, decrypt encrypted group of distinctive identifiers 122, using the private key for second software program 1243. If group of distinctive identifiers 31 were not hashed prior to transmission, they will be hashed at this time with the exception of first software program ID 23 after which control will fall through to enter processing block 128 enter group of distinctive identifiers into validation database.

Processing block 128 will enter the hashed group of distinctive identifiers 31 into validation database 52 in a specified format after which control will fall through to return processing block 130 return registration completed.

Processing block 130 will send signal 132 registration complete to notify processing block 134 notify user device registered.

Processing block 134 will present the user (not shown) with a message indicating that registration of their local/mobile computing device has been registered.

Upon completion of user notification of successful registration, processing block 136 will then securely erase any memory locations in software program 124 that were used to process group of specified distinctive identifiers 31.

Figure 4:
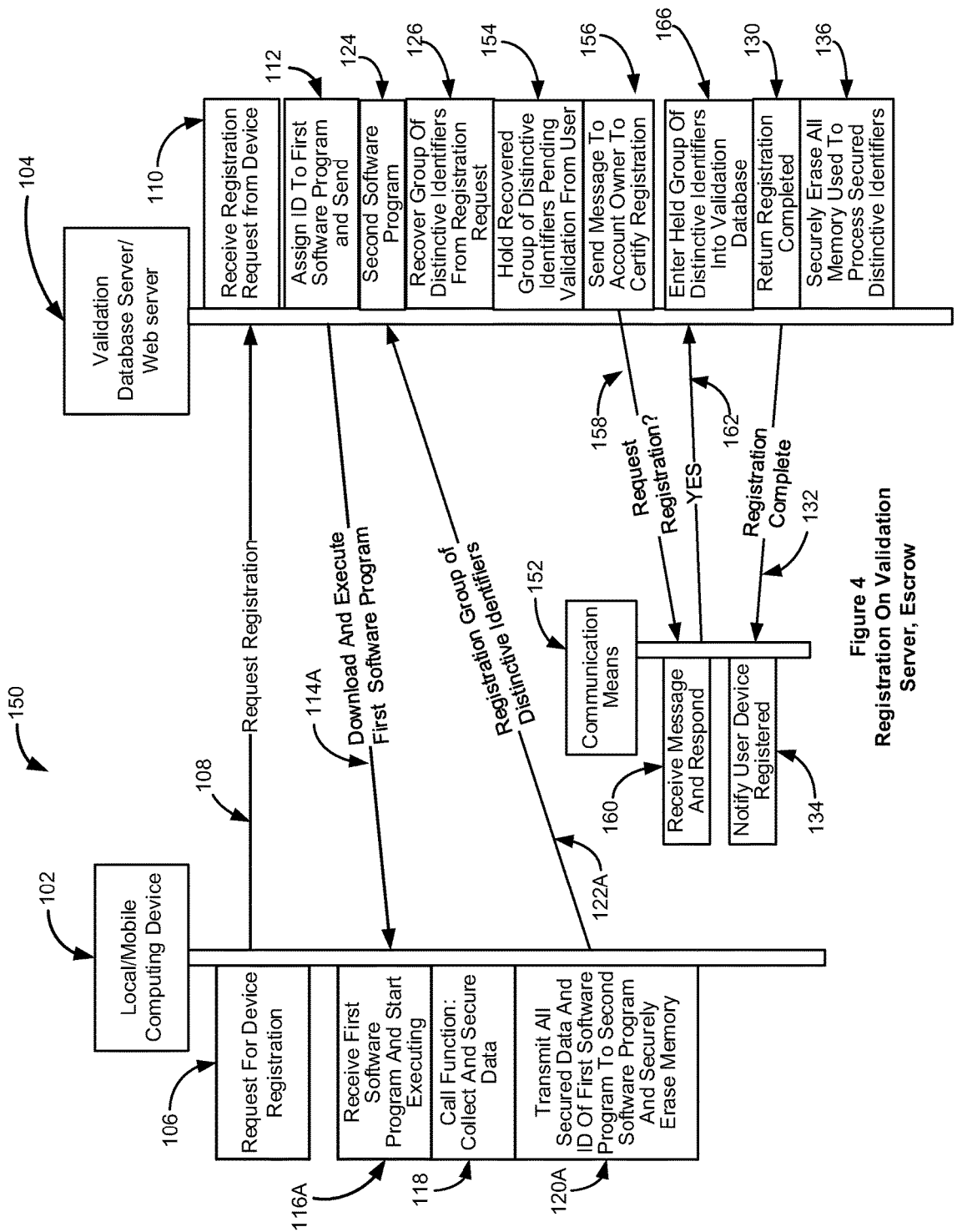
FIG. 4 is a depiction of a method of directly registering specified distinctive identifiers drawn from a local/mobile computing device, to a validation database residing on a validation server and whereby the registration values are escrowed prior to being entered into said validation database.

Now referencing FIG. 4 where 150 depicts local/mobile computing device 102 which may be a user's desktop computer, tablet computer, PDA, or smart cellular phone and validation database server/website 104 is a network resident server site where the validation database 52 resides. This figure depicts the registration of local/mobile computing device 102 with the validation database server 104 where group of distinctive identifiers 31 are initially escrowed prior to being entered into the validation database 52 until a confirmation is received from the rightful account holder.

Processing for this depiction begins at request processing bock 106 request for device registration. This processing block makes the assumption that this is the initial registration for local/mobile computing device 102 and that first software program is not resident on local/mobile computing device 102 and needs to be downloaded. Processing block 106 sends signal 108 request registration to validation database server/website 104 receive processing block 110 receive registration request from device.

Processing block 110 receives signal 108 and falls through to assign processing block 112 assign ID to first software program and send. This processing block assigns a unique ID to first software program (not shown) that may associate first software program to an individual user account. This processing block then sends signal 114A download and execute first software program to receive processing block 116A receive first software program and start execution.

Processing block 116A receives first software program and saves it to local/mobile computing device storage memory (not shown). Once first software program has been stored it is placed into execution at call function processing block 118 call function: collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120A transmit all secured data and ID of first software program to second software program and securely erase memory. Processing block 120A transmits group of distinctive identifiers 31 as signal 122A registration group of distinctive identifiers to second software program 124 residing in validation database server/website 104 then securely erases any memory locations in local/mobile computing device 102 that were used to construct group of distinctive identifiers 31.

Processing block 120A transmits group of distinctive identifiers 31 as signal 122A registration group of distinctive identifiers to second software program 124 residing in validation database server/website 104 then securely erases any memory locations in local/mobile computing device 102 that were used to construct group of distinctive identifiers 31.

Processing block 124 manages the archiving of group of distinctive identifiers 31 in validation database 52. Once second software program 124 receives signal 122A registration group of distinctive identifiers, control will fall through to recover processing block 126 recover group of distinctive identifiers from registration request.

Processing block 126 will, if secured group of distinctive identifiers 122 were encrypted prior to transmission, decrypt encrypted group of distinctive identifiers 122, using the private Key for second software program 124. If group of distinctive identifiers 31 were not hashed prior to transmission, they will be hashed at this time with the exception of first software ID 23 after which control will fall through to hold processing block 154 hold recovered group of distinctive identifiers pending validation from user.

Processing block 154 places a hold on group of recovered distinctive identifiers pending validation from user after which control falls through to send processing block 156 send message to account owner to certify registration.

Processing block 156 sends signal 158 request registration to communications means 152 receive processing block 160 receive message and respond. Communications means 152 searches a database of account owner's preferred means of electronically communicating based on the association of first software program's ID to the user's local/mobile computing device 102. Communications means 152 processing begins with processing block 160 which sends an email, text message, automated voice call, or other communications means to the user asking if they have attempted to register one of their local/mobile computing devices 102. If the user does not respond, communications means 152 will terminate the session and processing block 160 will time out. Once a time out occurs with second software program 124, it will, after the time out period, securely erase all memory used to process recovered group of distinctive identifiers.

If the user responds "YES" to the communications send by processing block 160, it will send signal 162 YES to processing block 166 enter held group of distinctive identifiers into validation database 166.

Processing block 166 will enter the hashed group of distinctive identifiers 31 that were being held pending validation by the account owner into the validation database 52 after which control will fall through to return processing block 130 return registration completed.

Processing block 130 will send signal 132 registration complete to communication means 152 notify processing block 134 notify user device registered.

Processing block 134 will present the user (not shown) with a message indicating that their local/mobile computing device has been registered.

Figure 5:
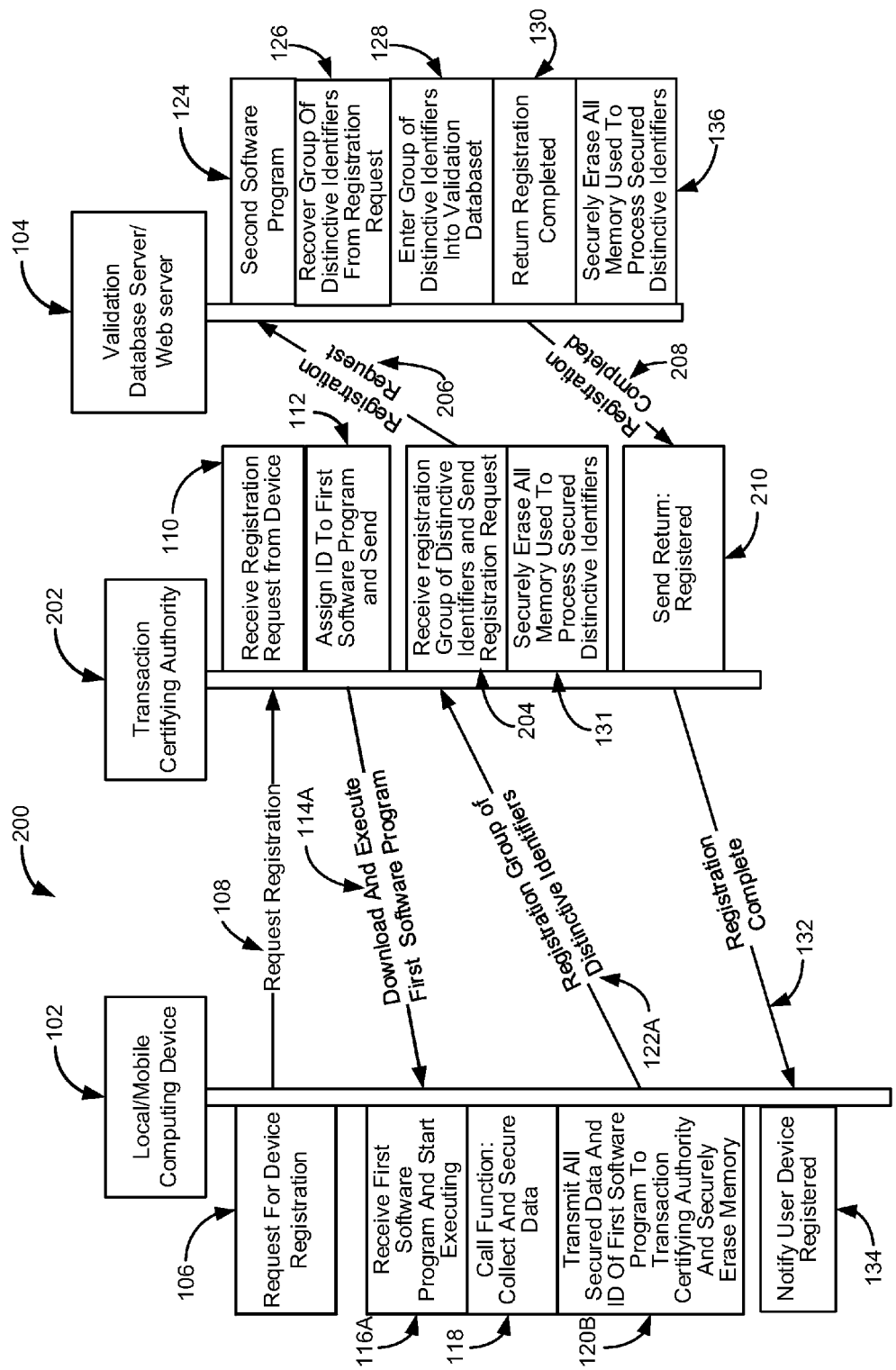
FIG. 5 is a depiction of a method whereby a transaction certifying authority is represented in the registration process of specified distinctive identifiers drawn from a local/mobile computing device, to a validation database residing on a validation database server/Web server and whereby the registration values are not escrowed prior to being entered into said validation database.

Now referencing FIG. 5 where 200 depicts local/mobile computing device 102 which may be a user's desktop computer, tablet computer, PDA, or smart cellular phone and validation database server/website 104 a network resident server site where validation database 52 resides. This figure depicts the registration of local/mobile computing device 102 through transaction certifying authority 202 which is positioned between local/mobile computing device 102 and validation database server 104. Transaction certifying authority may be a bank, credit card processor, or may be part of the processing center for a large merchant website. This depiction shows the process where a group of specified distinctive identifiers 31 from local/mobile computing device 102 is entered into validation database 52 resident on validation database server/website 104.

Processing for this depiction begins at request processing block 106 request for device registration. This processing block makes the assumption that this is the initial registration for local/mobile computing device 102 and that first software program is not resident on local/mobile computing device 102 and needs to be downloaded. Processing block 106 sends signal 108 request registration to transaction certifying authority 202 receive processing block 110 receive registration request from device.

Processing block 110 receives signal 108 and falls through to assign processing block 112 assign ID to first software program and send. This processing block assigns a unique ID to first software program (not shown) that will associate first software program to an individual user account in an account database (not shown) resident on transaction certifying authority 202. This processing block then sends signal 114A download and execute first software program to receive processing block 116A receive first software program and start execution.

Processing block 116A receives first software program and saves it to local/mobile computing device storage memory (not shown). Once first software program has been stored it is placed into execution at call function processing block 118 call function: collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120B transmit all secured data and ID of first software program to second software program and securely erase memory. Processing block 120B transmits group of distinctive identifiers 31 as signal 122A registration group of distinctive identifiers to second software program 124 residing in validation database server/website 104 then securely erases any memory locations in local/mobile computing device 102 that were used to construct group of distinctive identifiers 31.

Processing block 120B transmits group of specified distinctive identifiers 31 as signal 122A secured group of specified distinctive identifiers to receive processing block 204 receive registration group of specified distinctive identifiers and send registration request 206 then securely erases any memory locations in local/mobile computing device 102 that were used to construct group of specified distinctive identifiers 31.

Processing block 204 sends secured group of specified distinctive identifiers with a registration request as signal 206 registration request to second software program 124 residing on validation server/website. Second software program manages the archiving and matching of group of specified distinctive identifiers 31 in validation database 52. Once second software program 124 receives signal 206 registration request, control will fall through to recover processing block 126 recover group of distinctive identifiers from registration request. After processing block 204 sends signal 206, control will fall through to processing block securely erase 131 securely erase all memory used to process secured specified distinctive identifiers.

Processing block 126 will, if secured group of specified distinctive identifiers 122 were encrypted prior to transmission, decrypt encrypted registration group of distinctive identifiers 122A, using the private key for second software program 124. If group of specified distinctive identifiers 31 were not hashed prior to transmission, they will be hashed at this time after which control will fall through to enter processing block 128 enter group of distinctive identifiers into validation database.

Processing block 128 will enter the hashed group of specified distinctive identifiers 31 into the validation database in a specified format after which control will fall through to return processing block 130 return registration completed.

Processing block 130 will send signal 208 registration completed to send processing block 210 send return: registered.

Processing block 210 will send signal 132 registration complete to notify processing block 134 notify user device registered.

Processing block 134 will present the user (not shown) with a message indicating that registration of their local/mobile computing device has been registered.

Figure 6:
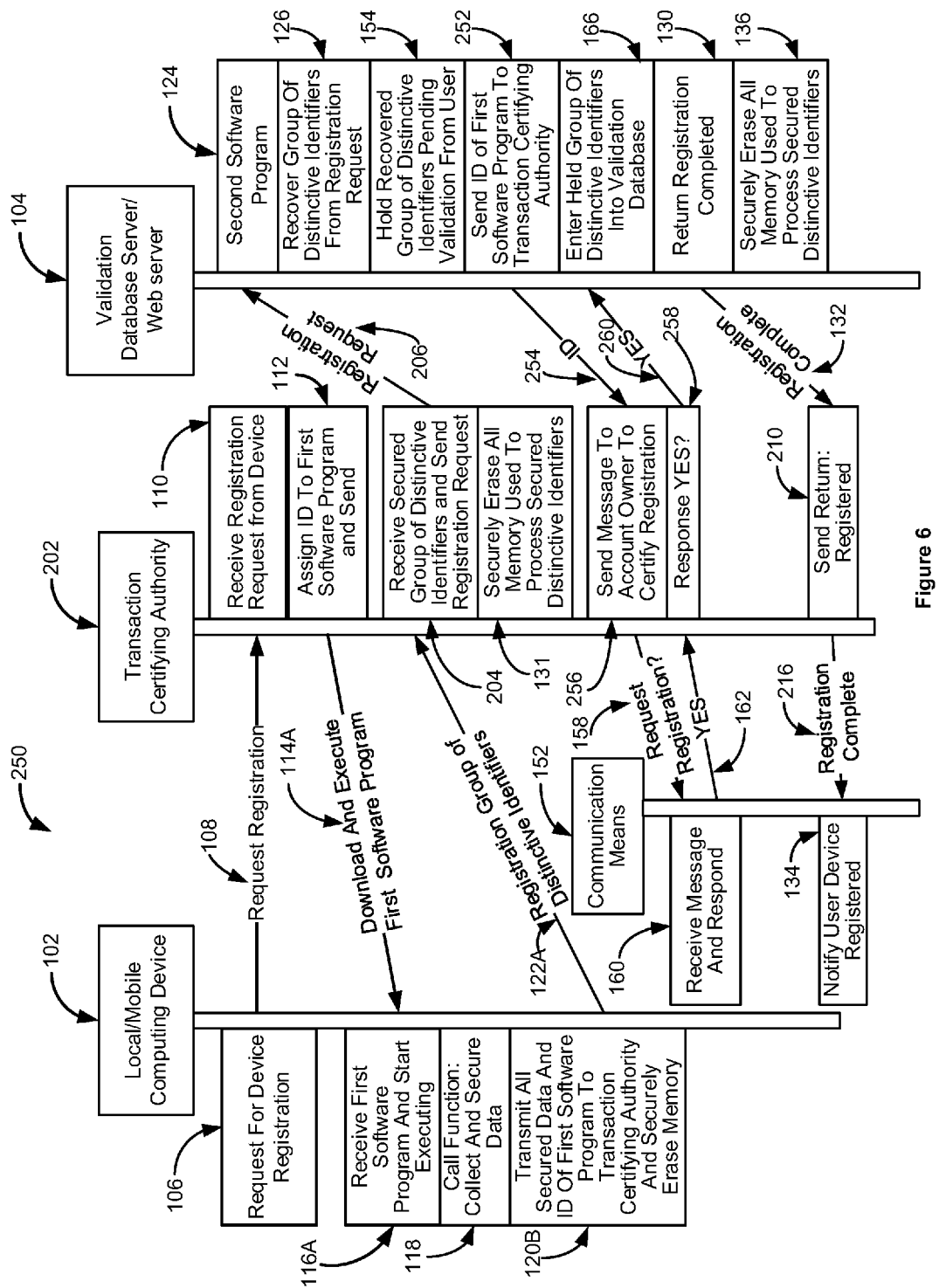
FIG. 6 is a depiction of a method whereby a transaction certifying authority is represented in the registration process of specified distinctive identifiers drawn from a local/mobile computing device, to a validation database residing on a validation database server/Web server and whereby the registration values are escrowed prior to being entered into the validation database.

Now referencing FIG. 6 where 250 depicts local/mobile computing device 102 which may be a user's desktop computer, tablet computer, PDA, or smart cellular phone and validation database server/website 104 a network resident server site where the validation database 52 resides. This figure depicts the registration of local/mobile computing device 102 through transaction certifying authority 202 which sits between local/mobile computing device 102 and validation database server 104. Transaction certifying authority may be a bank, credit card processor, or may be part of the processing center for a large merchant website. This depiction shows the process where a group of specified distinctive identifiers 31 from local/mobile computing device 102 are initially escrowed prior to being entered into validation database 52 resident on validation database server/website 104 until a confirmation is received from the rightful account holder.

Processing for this depiction begins at request processing block 106 request for device registration. This processing block makes the assumption that this is the initial registration for local/mobile computing device 102 and that first software program is not resident on local/mobile computing device 102 and needs to be downloaded. Processing block 106 sends signal 108 request registration to transaction certifying authority 202 receive processing block 110 receive registration request from device.

Processing block 110 receives signal 108 and falls through to assign processing block 112 assign ID to first software program and send. This processing block assigns a unique ID to first software program (not shown) that will associate first software program to an individual user account in an account database (not shown) resident on transaction certifying authority 202. This processing block then sends signal 114A download and execute first software program to receive processing block 116A receive first software program and start execution.

Processing block 116A receives first software program (not shown) and saves it to local/mobile computing device storage memory (not shown). Once first software program has been stored it is placed into execution at call function processing block 118 call function: collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120B transmit all secured data and ID of first software program to second software program and securely erase memory. Processing block 120B transmits group of distinctive identifiers 31 as signal 122A registration group of distinctive identifiers to second software program 124 residing in validation database server/website 104 then securely erases any memory locations in local/mobile computing device 102 that were used to construct group of distinctive identifiers 31.

Processing block 120B transmits group of specified distinctive identifiers 31 as signal 122A registration group of distinctive identifiers to receive processing block 204 receive registration group of distinctive identifiers and send registration request then securely erases any memory locations in local/mobile computing device 102 that were used to construct group of specified distinctive identifiers 31.

Processing block 204 sends registration group of distinctive identifiers with a registration request as signal 206 registration request to second software program 124 residing on validation server/web server. Second software program manages the archiving and matching of group of specified distinctive identifiers 31 in validation database 52.

Once second software program 124 receives signal 206 registration request, control will fall through to recover processing block 126 recover group of specified distinctive identifiers from registration request. After processing block 204 sends signal 206, control will fall through to processing block securely erase 131 securely erase all memory used to process secured specified distinctive identifiers.

Processing block 126 will, if of registration group of distinctive identifiers 122 were encrypted prior to transmission, decrypt encrypted group of specified distinctive identifiers 122, using the private key for second software program 124. If group of specified distinctive identifiers 31 were not hashed prior to transmission, they will be hashed at this time with the exception of first software program ID 23 after which control will fall through to hold processing block 154 hold recovered group of distinctive identifiers pending validation from user.

Processing block 154 places a hold on group of recovered distinctive identifiers pending validation from the user after which control falls through to send processing block 252 send ID of first software program to transaction certifying authority 202. Processing block 252 sends signal 254 ID to send processing block 256 send message to account owner to certify registration.

Processing block 256 sends signal request registration to communications means 152 receive processing block 160 receive message and respond. Communications means 152 searches a database of account owner's preferred means of electronically communicating (not shown) based on the association of first software program's ID to the user's local/mobile computing device 102. Communications means 152 processing begins with processing block 160 which sends an email, text message, automated voice call, or other communications means to the user asking if they have attempted to register one of their local/mobile computing devices 102. If the user does not respond, communications means 152 will terminate the session and receive message and respond processing block 160 will time out. Once a time out occurs with second software program 124, it will, after the time out period, securely erase all memory used to process recovered group of distinctive identifiers.

If the user responds "YES" to the communications send by processing block 160, it will send signal 162 YES to response processing block 258 which in turn will send signal 260 YES to enter processing block 166 enter held group of distinctive identifiers into validation database 52

Processing block 166 will enter the hashed group of specified distinctive identifiers 31 that were being held pending validation by the account owner into the validation database in a specified format after which control will fall through to return processing block 130 return registration completed.

Processing block 130 will send signal 132 registration complete to send processing block 210 send return: registered. Processing block 210 will in turn send signal 216 registration complete to communication means 152 notify processing block 134 notify user device registered. Processing block 134 will present the user (not shown) with a message indicating that their local/mobile computing device has been registered.

Figure 7:
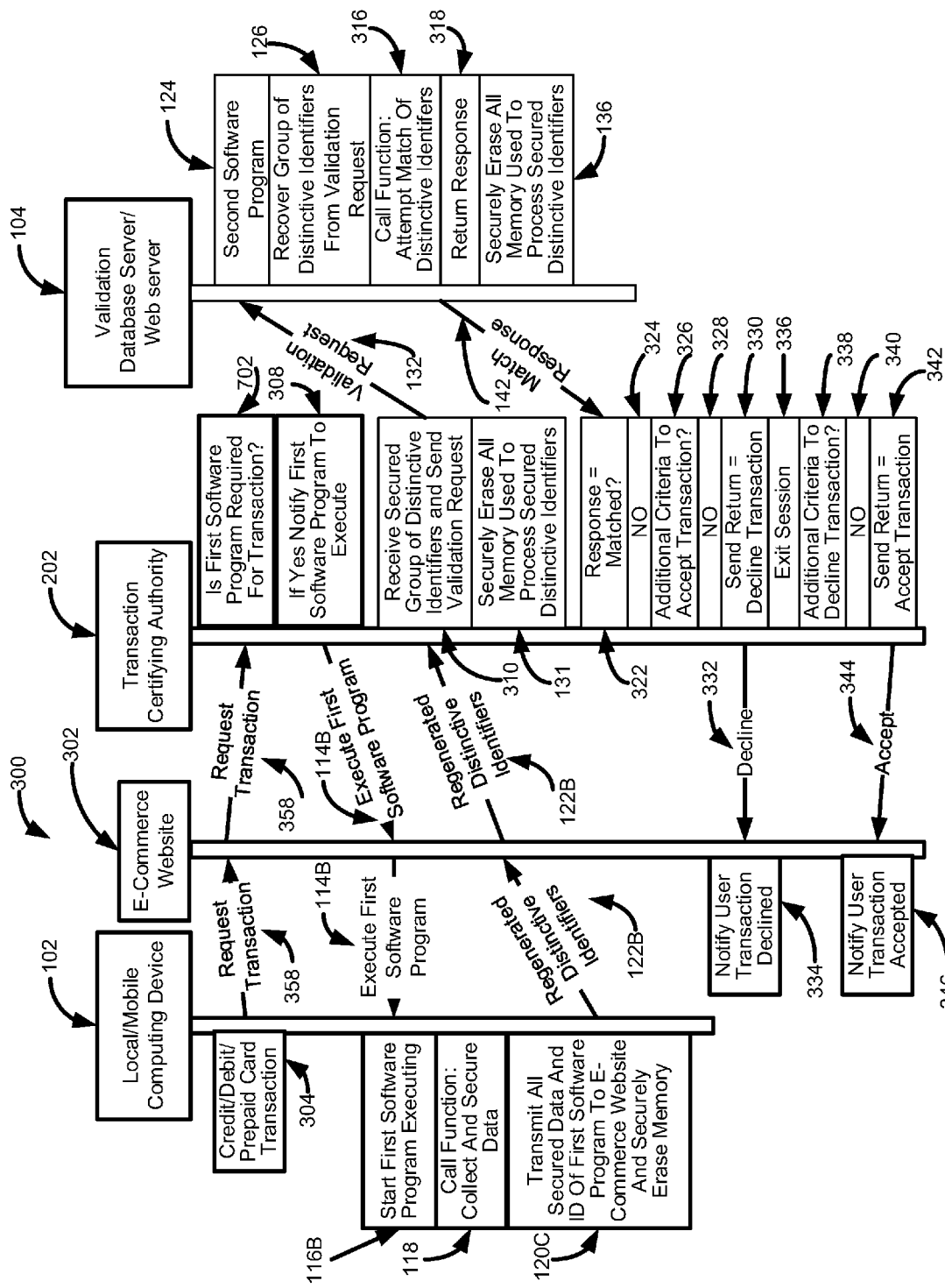
FIG. 7 is a depiction of a card not present transaction, such as an e-Commerce purchase online, where the user's credit/debit card is not physically presented as part of the transaction.

Now referencing FIG. 7 where 300 depicts local/mobile computing device 102 which may be a user's desktop computer, tablet computer, PDA, or smart cellular phone and validation database server/website 104 a network resident server site where validation database 52 resides. This figure depicts an e-Commerce type Website 302 transaction and involving a transaction certifying authority 202 which sits between local/mobile computing device 102 and validation database server 104. Transaction certifying authority may be a bank, credit card processor, or may be part of the processing center for a large merchant website. This depiction shows the process whereby a group of regenerated specified distinctive identifiers 31 collected from a local/mobile computing device 102 is sent via the transaction certifying authority 202 to the validation database 52 resident on validation database server/website 104 for matching to an existing entry of a group of registered specified distinctive identifiers to verify that the local/mobile computing device is registered and valid.

The transaction starts at local/mobile computing device 102 processing block 304 request for transaction. Processing block 304 sends signal 358 request transaction to e-Commerce website 302. The e-Commerce website forwards request transaction 358 to processing block 702 resident on the transaction certifying authority.

Processing block 702 will, after receiving signal 358 will determine if the account being used in this transaction requires validation of the local/mobile computing device 102 based on records maintained by the transaction certifying authority. If transaction certifying authority 202 determines that validation of a local mobile computing device 102 is required, processing block 702 falls through to processing block 308 if yes notify first software program to execute which sends signal 114B execute first software program to e-Commerce website 302, which passes signal 114B to start processing block 116B start first software program executing.

Processing block 116B places first software program (not shown) into execution at call function processing block 118 call function: regenerate, collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120C transmit all secured data and ID of first software program to E-commerce website and securely erase memory. Processing block 120C transmits group of distinctive identifiers 31 as signal 122B regenerated distinctive identifiers to E-Commerce website then securely erases any memory locations in local/mobile computing device 102 that were used to construct group of distinctive identifiers 31.

Processing block 120C transmits group of distinctive identifiers 31 as signal 122B regenerated specified distinctive identifiers to e-Commerce website 302 which then forwards said signal 122B to receive processing block 310 receive secured group of distinctive identifiers and send validation request of transaction certifying authority 202. Signal 122B is received by processing block 310 which then sends validation request 132, including signal 122B to second software program 124 After processing block 310 sends signal 132, control will fall through to securely erase processing block 131 securely erase all memory used to process secured regenerated specified distinctive identifiers.

Second software program 124 receives validation request 132 after which control falls through to recover processing block 126 recover group of distinctive identifiers from validation request.

Processing block 126 will, if secured group of distinctive identifiers 122B were encrypted prior to transmission, decrypt encrypted group of regenerated specified distinctive identifiers 122B, using the private key for second software program 124. If group of distinctive identifiers 31 were not hashed prior to transmission, they will be hashed at this time with the exception of first software program ID 23 after which control will fall through to call function processing block 316 call function: attempt match of distinctive identifiers 602.

Call function processing block 602 will search validation database 52, which is a collection of a group of registered specified distinctive identifiers 31. Validation database 52 is searched using current received group of regenerated distinctive identifiers as the data object to be matched. If a match is not made between current received group of regenerated specified distinctive identifiers and any group of registered specified distinctive identifiers contained in the validation database, additional searches may be made that exclude any of the regenerated distinctive identifiers in the current received group of regenerated distinctive identifiers that have their associated state flag 32 set to "don't care". If no match was found with the "don't care" state flag 32 set, the return will be set to NO MATCH. If the additional searches found a match, the return will be set to MATCHED. If the first search results in a match being found, the return will be set to MATCHED. After the search has been performed control will be returned to processing block 316 after which control will fall through to return processing block 318 return response.

Processing block 318 will send signal 142 match response to decision processing block 322 response=matched?. After signal 142 has been sent, control will fall through to securely erase processing block 136 securely erase all memory used to process secured regenerated specified distinctive identifiers.

Processing block 322 will, if signal 142=MATCHED, transfer control to additional processing block 338, additional criteria to decline transaction.

Processing block 338 will examine the user's account to determine if there are additional criteria that would cause the transaction to be declined. If there is no additional criteria to decline the transaction control will fall through to results processing block 340 NO, after which control will fall through to send processing block 342 send return=ACCEPT transaction. Processing block 342 will send signal 344 ACCEPT to notify processing block 346 Notify user transaction accepted. If processing block 338 found additional criteria that would cause the transaction to be declined control will be transferred to send processing block 330 send return=decline transaction. Processing block 330 will send signal 332 DECLINE to notify processing block 334 notify user transaction declined.

If Processing block 322 determines that signal 142=NOT MATCHED, it will transfer control to additional processing block 326, additional criteria to accept transaction. If processing block 326 did not find additional criteria that would cause the transaction to be accepted, control will be transferred to send processing block 330 send return=decline transaction. Processing block 330 will send signal 332 DECLINE to notify processing block 334 notify user transaction declined.

Figure 8:
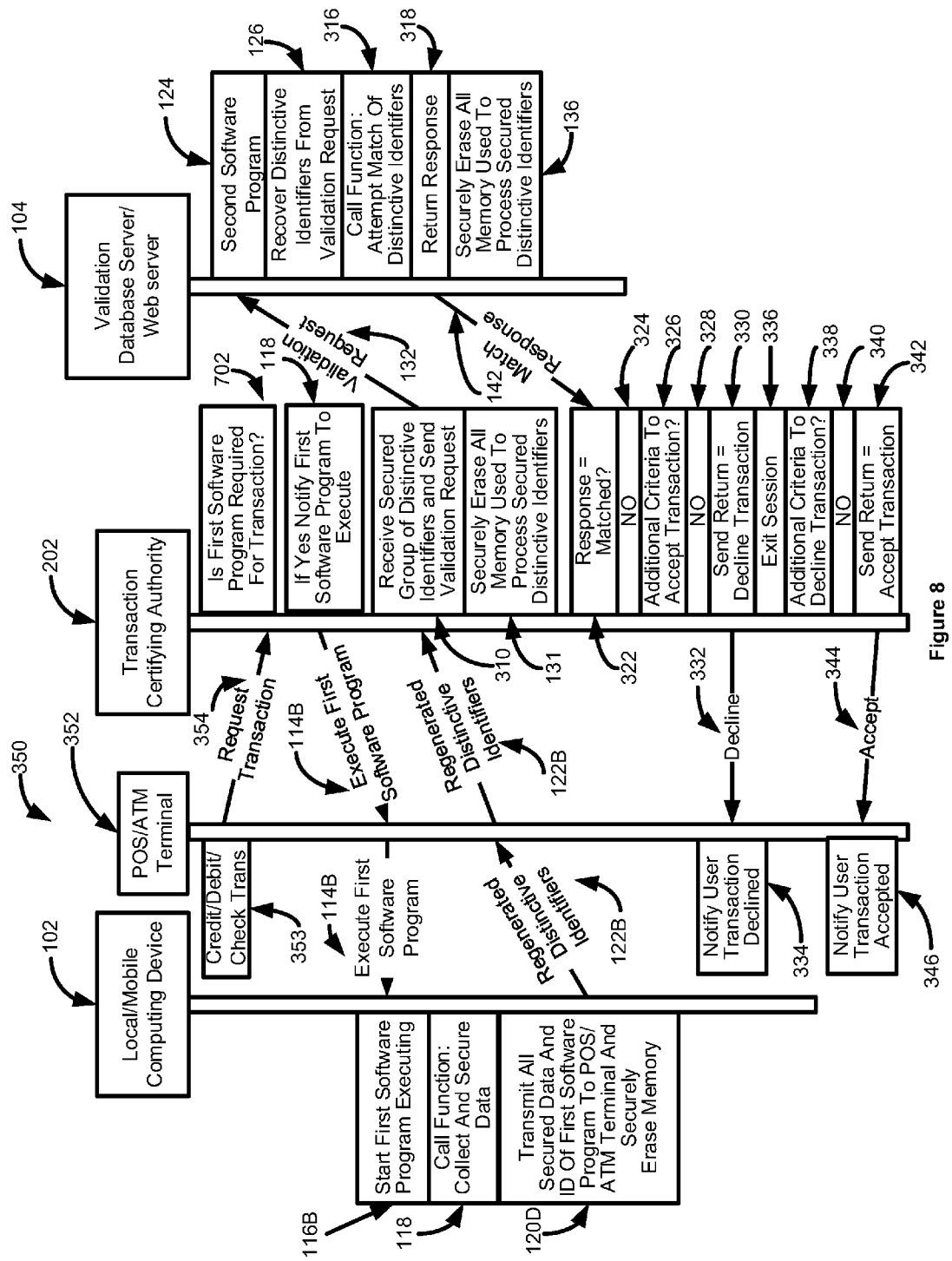
FIG. 8 is a depiction of a card present transaction, such as a purchase at a merchant's place of business, where the user's credit/debit card or paper check is physically presented as part of the transaction.

Now referencing FIG. 8 350 where local/mobile computing device 102 may be a user's desktop computer, tablet computer, PDA, or smart cellular phone and validation database server/website 104 a network resident server site where the validation database 52 resides. This figure depicts a transaction initiated by a user's credit/debit/check card through a POS/ATM Terminal 352 which may add additional validation requirements for a user making a purchase or transaction at POS/ATM Terminal 352. POS/ATM Terminal 352 sits between the user's local/mobile computing device 102 and the transaction certifying authority 202. Communications between local/mobile computing device 102 and POS/ATM Terminal 352 is obtained through any known wireless means including, but not limited to, WiFi (802.11), Bluetooth, NFC (near field communications), or other RF means.

Processing for this depiction starts with a user presenting their physical card, such as a credit/debit card, prepaid card, store issued card or a paper check for settlement of a financial purchase transaction or to inquire about account details Processing block 353 initiates the transaction request to said POS/ATM terminal 352 which sends signal 354 request transaction to transaction certifying authority 202 processing block 702.

Processing block 702 will, after receiving signal 354 and determine if the account being used in this transaction requires validation of the local/mobile computing device based on records maintained by the transaction certifying authority. If transaction certifying authority determines that validation of a local mobile computing device 102 is required, processing block 702 falls through to processing box 118 which sends signal 114B start regeneration execution by the first software program to POS/ATM Terminal 352, which passes signal 114B to start processing block 116B start first software program executing.

Processing block 116B places first software program (not shown) into execution at call function processing block 118 call function: regenerate, collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120D transmit all secured data and ID of first software program to second software program and securely erase memory. Processing block 120D transmits group of distinctive identifiers 31 as signal 122B regenerated distinctive identifiers to second software program 124 residing in validation database server/website 104 then securely erases any memory locations in local/mobile computing device 102 that were used to construct group of distinctive identifiers 31.

Processing block 120C transmits group of distinctive identifiers 31 as signal 122B secured group of regenerated specific distinctive identifiers to POS/ATM Terminal 352, which in turns sends signal 122B secured group of regenerated distinctive identifiers to receive processing block 310 which receives secured group of regenerated distinctive identifiers. Processing block 310 sends signal 132 validation request, which includes signal 122B which is a secured group of regenerated specified distinctive identifiers, to second software program 124. After processing block 310 sends sending signal 124, control will fall through to securely erase processing block 131, which securely erases all memory used to process said regenerated specified distinctive identifiers.

Second software program 124 receives validation request after which control falls through to recover processing block 126 recover group of regenerated specified distinctive identifiers from validation request 132.

Processing block 126 will, if secured group of regenerated specified distinctive identifiers 122B was encrypted prior to transmission, decrypt encrypted group of regenerated specified distinctive identifiers 122B, using the private key for second software program 124. If group of distinctive identifiers 31 were not hashed prior to transmission, they will be hashed at this time after which control will fall through to call function processing block 316 call function: attempt match of regenerated specified distinctive identifiers 602.

Call function processing block 602 will search validation database 52, which is a collection of a group of registered specified distinctive identifiers 31. Validation database 52 is searched using current received group of regenerated distinctive identifiers as the data object to be matched. If a match is not made between current received group of regenerated specified distinctive identifiers and any group of registered specified distinctive identifiers contained in the validation database, additional searches may be made that exclude any of the regenerated distinctive identifiers in the current received group of regenerated distinctive identifiers that have their associated state flag 32 set to "don't care". If no match was found with the "don't care" state flag 32 set, the return will be set to NO MATCH. If the additional searches found a match, the return will be set to MATCHED. If the first search results in a match being found, the return will be set to MATCHED. After the search has been performed control will be returned to processing block 316 after which control will fall through to return processing block 318 return response.

Processing block 318 will send signal 142 match response to decision processing block 322 response=matched?. After signal 142 has been sent, control will fall through to securely erase processing block 136, which securely erases all memory used to process secured distinctive identifiers.

Processing block 322 will, if signal 142=MATCHED, transfer control to additional processing block 338, additional criteria to decline transaction.

Processing block 338 will examine the user's account to determine if there is additional criteria that would cause the transaction to be declined. If there is no additional criteria to decline the transaction control will fall through to results processing block 340 NO, after which control will fall through to send processing block 342 send return=ACCEPT transaction. Processing block 342 will send signal 344 ACCEPT to POS/ATM Terminal 352 notify processing block 346 Notify user transaction accepted. If processing block 338 found additional criteria that would cause the transaction to be declined control will be transferred to send processing block 330 send return=decline transaction. Processing block 330 will send signal 332 DECLINE to POS/ATM Terminal 352 notify processing block 334 notify user transaction declined.

If Processing block 322 determines that signal 142=NOT MATCHED, it will transfer control to additional processing block 326, additional criteria to accept transaction. If processing block 326 did not find additional criteria that would cause the transaction to be accepted, control will be transferred to send processing block 330 send return=decline transaction. Processing block 330 will send signal 332 DECLINE to notify processing block 334 notify user transaction declined.

Figure 9:
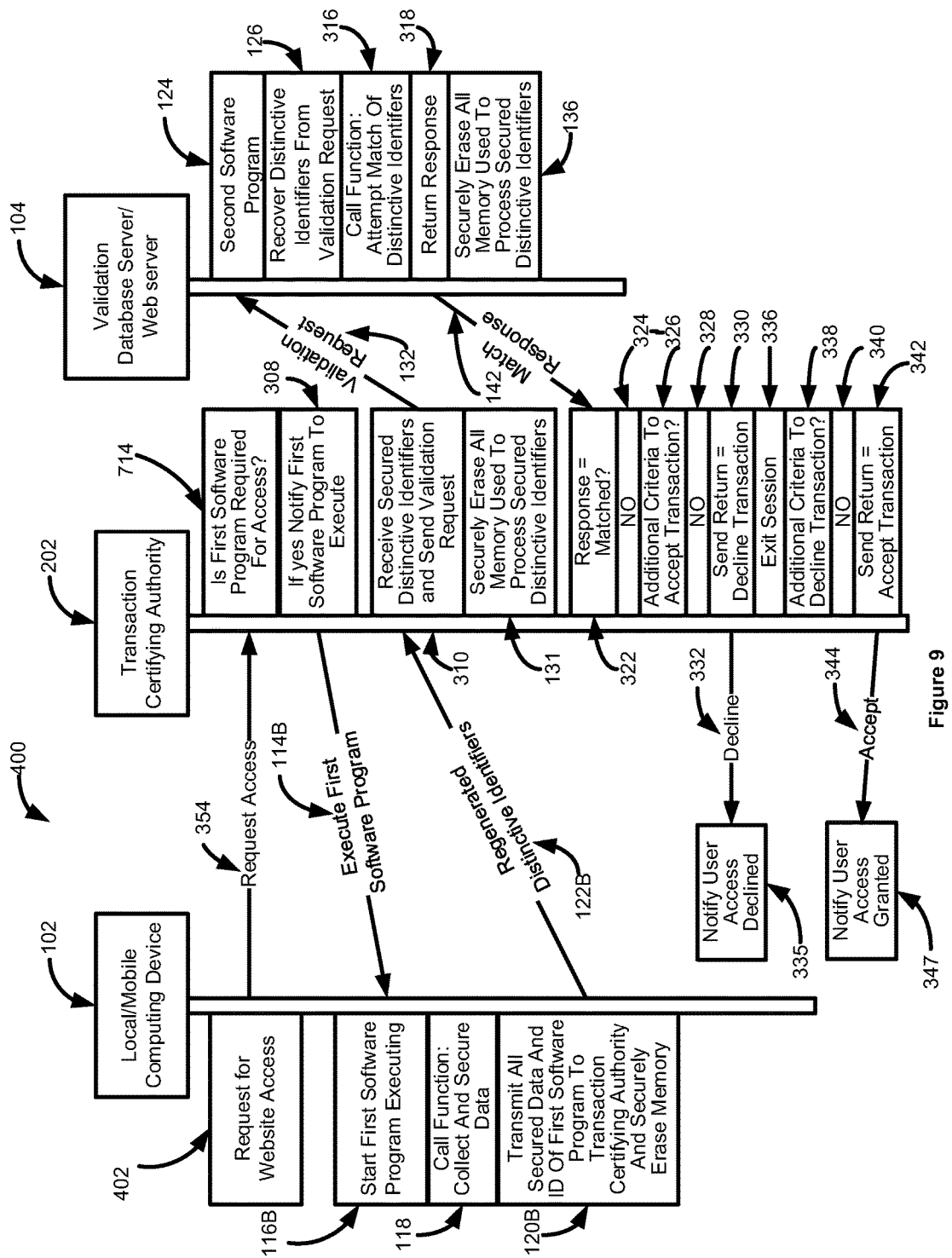
FIG. 9 is a depiction of a transaction requesting access to a website or website account.

Now referencing FIG. 9 where 400 depicts local/mobile computing device 102 which may be a user's desktop computer, tablet computer, PDA, or smart cellular phone and validation database server/Web server 104 a network resident server site where the validation database 52 resides. This figure depicts a request for website access transaction 354 initiated by local/mobile computing device 102 through transaction certifying authority 202 and which is positioned between local/mobile computing device 102 and validation database server 104. Transaction certifying authority 202 may be a merchant website or another website housing a user's account. This depiction shows the process where a group of regenerated specified distinctive identifiers 31 from local/mobile computing device 102 is sent via the transaction certifying authority 202 to the validation database 52 resident on validation database server/website 104 for matching to an existing entry of a group of registered specified distinctive identifiers to verify that the local/mobile computing device 102 is registered and valid in order to grant access to a website account.

The transaction starts at local/mobile computing device 102 processing block 402 request for website access. Processing block 402 sends signal 354 request access to decision processing block 714 is first software program required for access.

Processing block 714 will, after receiving signal 354 will determine if the account being used in this access request requires validation of the local/mobile computing device 102 based on records maintained by the transaction certifying authority 202. If transaction certifying authority 202 determines that validation of a local mobile computing device 102 is required, processing block 714 falls through to processing block if yes notify first software program to execute. Processing block 308 then sends signal 114B execute first software program to start processing block 116B start first software program executing regeneration of the specified distinctive identifiers.

Processing block 116B places first software program (not shown) into execution at call function processing block 118 call function: regenerate, collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120B transmit all secured data and ID of first software program to second software program and securely erase memory. Processing block 120B transmits group of distinctive identifiers 31 as signal 122B regenerated distinctive identifiers to second software program 124 residing in validation database server/website 104 then securely erases any memory locations in local/mobile computing device 102 that were used to construct group of distinctive identifiers 31.

Processing block 120B transmits group of distinctive identifiers 31 as signal 122 regenerated distinctive identifiers to receive processing block 310 receive secured distinctive identifiers which then sends validation request signal 132 and where the validation request includes signal 122 regenerated distinctive identifiers to second software program 124. After processing block 310 sends sending signal 124, control will fall through to securely erase processing block 131 securely erase all memory used to process secured specified distinctive identifiers.

Second software program 124 receives validation request 132 after which control falls through to recover processing block 126 recover distinctive identifiers from validation request.

Processing block 126 will, if secured group of specified distinctive identifiers 122 were encrypted prior to transmission, decrypt encrypted group of specified distinctive identifiers 31, using the private key for second software program 124. If group of specified distinctive identifiers 31 were not hashed prior to transmission, they will be hashed at this time with the exception of first software program ID 23 after which control will fall through to call function processing block 316 call function: attempt match of specified distinctive identifiers 602.

Call function processing block 602 will search validation database 52, which is a collection of a group of registered specified distinctive identifiers 31. Validation database 52 is searched using current received group of regenerated distinctive identifiers as the data object to be matched. If a match is not made between current received group of regenerated specified distinctive identifiers and any group of registered specified distinctive identifiers contained in the validation database, additional searches may be made that exclude any of the regenerated distinctive identifiers in the current received group of regenerated distinctive identifiers that have their associated state flag 32 set to "don't care". If no match was found with the "don't care" state flag 32 set, the return will be set to NO MATCH. If the additional searches found a match, the return will be set to MATCHED. If the first search results in a match being found, the return will be set to MATCHED. After the search has been performed control will be returned to processing block 316 after which control will fall through to return processing block 318 return response.

Processing block 318 will send signal 142 match response to decision processing block 322 response=matched?. After signal 142 has been sent, control will fall through to processing block 136 securely erase all memory used to process secured specified distinctive identifiers.

Processing block 322 will, if signal 142=MATCHED, transfer control to additional processing block 338, additional criteria to decline transaction.

Processing block 338 will examine the user's account to determine if there are additional criteria that would cause the transaction to be declined. If there is no additional criteria to decline the transaction control will fall through to results processing block 340 NO, after which control will fall through to send processing block 342 send return=ACCEPT transaction. Processing block 342 will send signal 344 ACCEPT to notify processing block 347 Notify user access granted. If processing block 338 found additional criteria that would cause the transaction to be declined control will be transferred to send processing block 330 send return=decline transaction. Processing block 330 will send signal 332 DECLINE to notify processing block 335 notify user access declined.

If Processing block 322 determines that signal 142=NOT MATCHED, it will transfer control to additional processing block 326, additional criteria to accept transaction. If processing block 326 did not find additional criteria that would cause the transaction to be accepted, control will be transferred to send processing block 330 send return=decline transaction.

Figure 10:
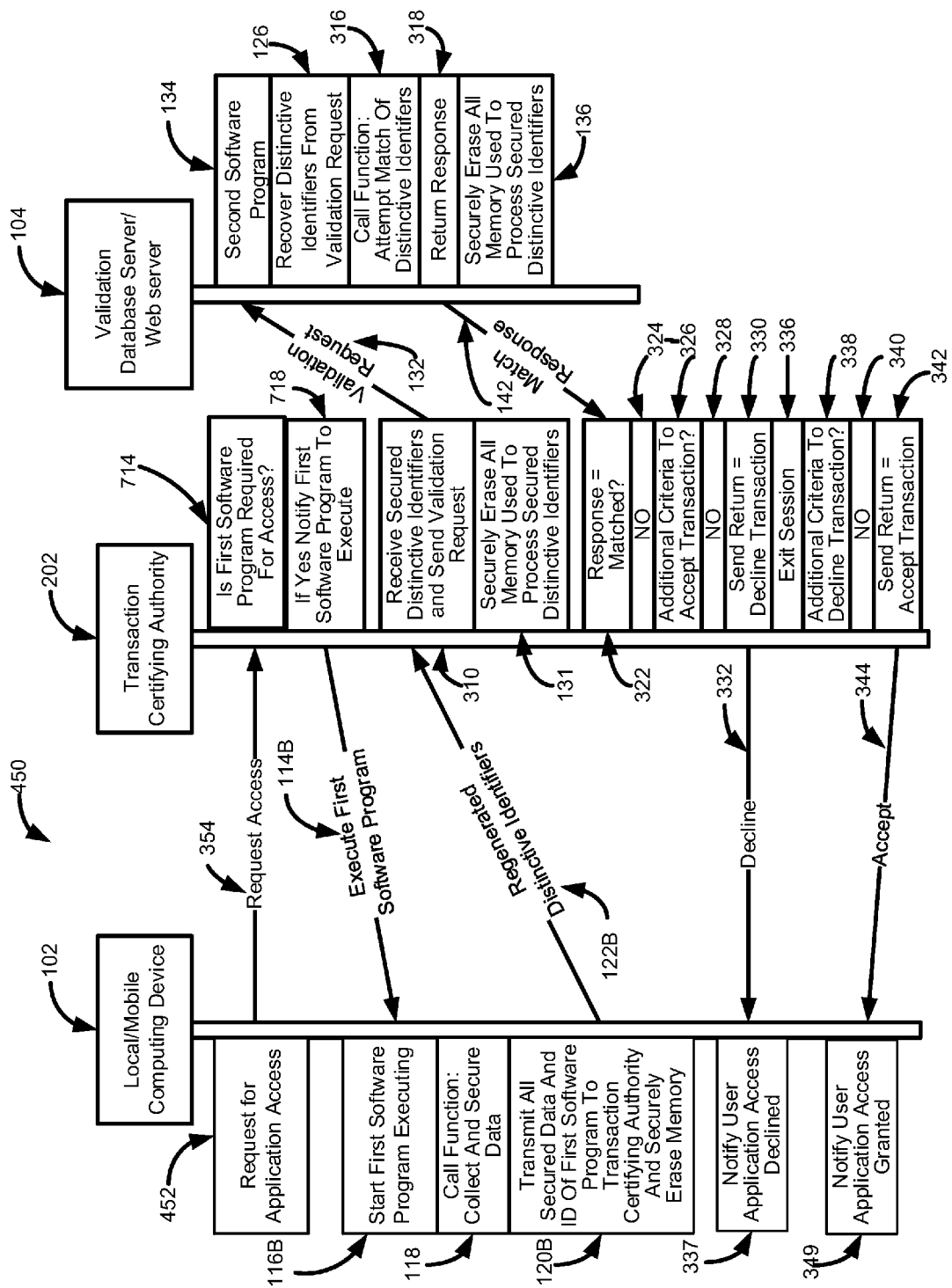
FIG. 10 is a depiction of a transaction requesting access to an application, operating system or secured data residing on a local/mobile computing device.

Now referencing FIG. 10 where 450 depicts local/mobile computing device 102 which may be a user's desktop computer, tablet computer, PDA, or smart cellular phone and validation database server/website 104 a network resident server site where the validation database 52 resides. This figure depicts a transaction initiated by local/mobile computing device 102 through transaction certifying authority 202 which sits between local/mobile computing device 102 and validation database server 104. Transaction certifying authority 202 may be, but is not limited to, a merchant or software application developer website. This depiction shows the process whereby a group of regenerated specified distinctive identifiers 31 from local/mobile computing device 102 is sent via the transaction certifying authority 202 to the validation database 52 resident on validation database server/website 104 for matching to an existing entry of a group of registered specified distinctive identifiers to verify that the local/mobile computing device is registered and valid and that application access can be granted.

The transaction is started by a request to access an application, operating system or secure data resident on the local/mobile computing device 102, with processing block 452 request for application access. Processing block 452 sends signal 354 request access to receive processing block 714.

Processing block 714 will, after receiving signal 354 will determine if the account being used in this access request requires validation of the local/mobile computing device 102 based on records maintained by the transaction certifying authority 202. If transaction certifying authority 202 determines that validation of a local mobile computing device 102 is required, processing block 714 falls through to processing block 718 if yes notify first software program to execute. Processing block 308 then sends signal 114B execute first software program to start processing block 116B start first software program executing regeneration of the specified distinctive identifiers.

Processing block 116B places first software program (not shown) into execution at call function processing block 118 call function: regenerate, collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120B transmit all secured data and ID of first software program to second software program and securely erase memory. Processing block 120B transmits group of distinctive identifiers 31 as signal 122B regenerated distinctive identifiers to second software program 124 residing in validation database server/website 104 then securely erases any memory locations in local/mobile computing device 102 that were used to construct group of distinctive identifiers 31.

Processing block 120B transmits group of specified distinctive identifiers 31 as signal 122B regenerated distinctive identifiers to receive processing block 310 receive secured group of distinctive identifiers which then sends validation request signal 132 validation request which includes signal 122B regenerated distinctive identifiers to second software program 124. After processing, block 310 sends signal 132, control will fall through to securely erase processing block 131 which will securely erase all memory used to process secured regenerated specified distinctive identifiers.

Second software program 124 receives validation request including signal 122B after which control falls through to recover processing block 126 recover distinctive identifiers from validation request 132.

Processing block 126 will, if secured group of regenerated specified distinctive identifiers 122B were encrypted prior to transmission, decrypt encrypted group of regenerated specified distinctive identifiers 122B, using the private key for second software program 124. If group of specified distinctive identifiers 31 were not hashed prior to transmission, they will be hashed at this time with the exception of first software program ID 23 after which control will fall through to call function processing block 316 call function: attempt match of regenerated specified distinctive identifiers 602.

Call function processing block 602 will search validation database 52, which is a collection of a group of registered specified distinctive identifiers 31. Validation database 52 is searched using current received group of regenerated distinctive identifiers as the data object to be matched. If a match is not made between current received group of regenerated specified distinctive identifiers and any group of registered specified distinctive identifiers contained in the validation database, additional searches may be made that exclude any of the regenerated distinctive identifiers in the current received group of regenerated distinctive identifiers that have their associated state flag 32 set to "don't care". If no match was found with the "don't care" state flag 32 set, the return will be set to NO MATCH. If the additional searches found a match, the return will be set to MATCHED. If the first search results in a match being found, the return will be set to MATCHED. After the search has been performed control will be returned to processing block 316 after which control will fall through to return processing block 318 return response.

Processing block 318 will send signal 142 match response to decision processing block 322 response=matched?. After signal 142 has been sent, control will fall through to securely erase processing block 136 securely erase all memory used to process the regenerated specified distinctive identifiers 122B.

Processing block 322 will, if signal 142=MATCHED, transfer control to additional processing block 338, additional criteria to decline transaction.

Processing block 338 will examine the user's account to determine if there are additional criteria that would cause the transaction to be declined. If there is no additional criteria to decline the transaction control will fall through to results processing block 340 NO, after which control will fall through to send processing block 342 send return=ACCEPT transaction. Processing block 342 will send signal 344 ACCEPT to notify processing block 349 Notify user application access granted. If processing block 338 found additional criteria that would cause the transaction to be declined control will be transferred to send processing block 330 send return=decline transaction. Processing block 330 will send signal 332 DECLINE to notify processing block 337 notify user application access declined.

If Processing block 322 determines that signal 142=NOT MATCHED, it will transfer control to additional processing block 326, additional criteria to accept transaction. If processing block 326 did not find additional criteria that would cause the transaction to be accepted, control will be transferred to send processing block 330 send return=decline transaction. Processing block 330 will send signal 332 DECLINE to notify processing block 337 notify user application access declined.

Figure 11:
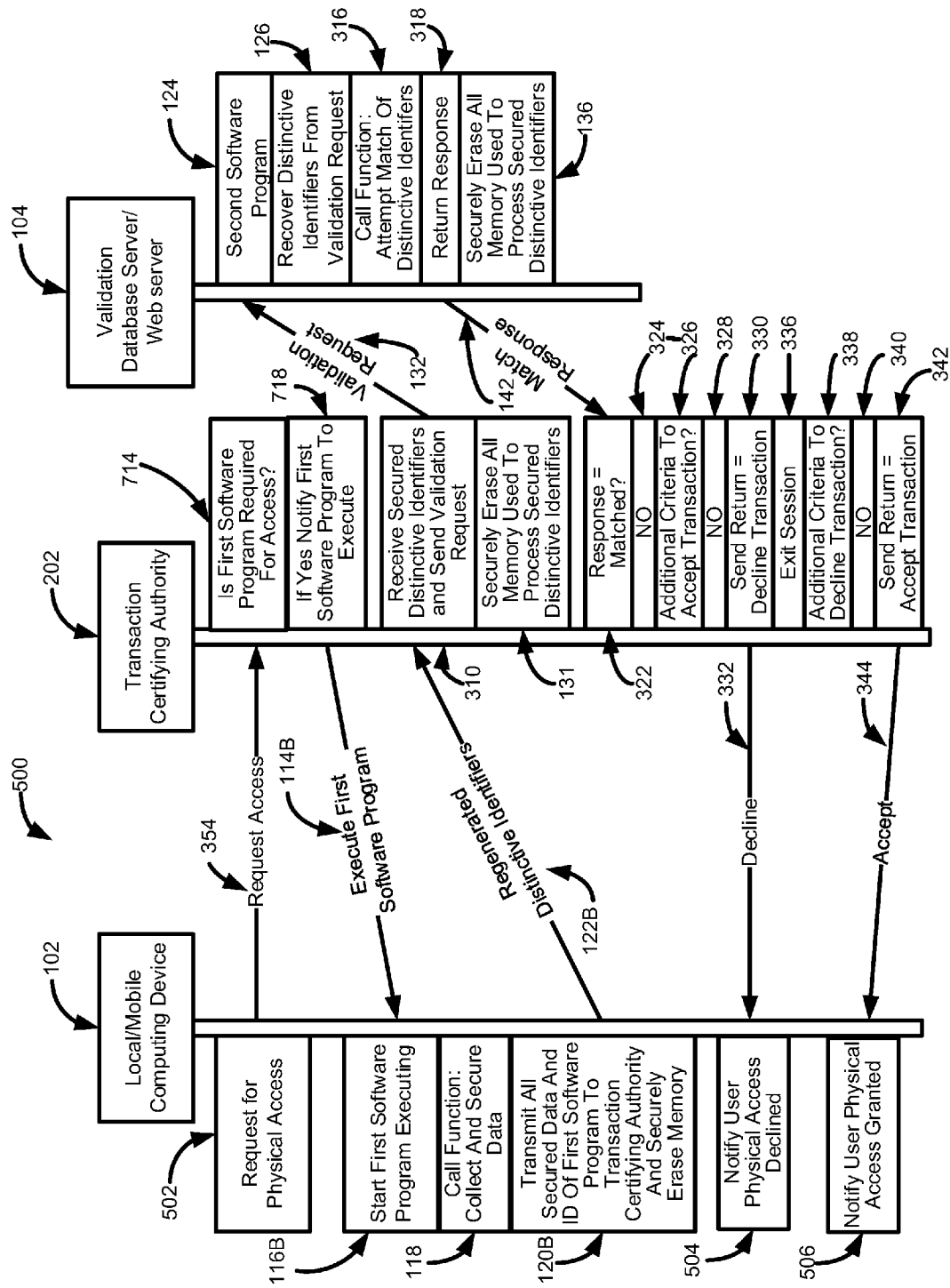
FIG. 11 is a depiction of an access transaction requesting the physical unlocking of a network connected electronically secured locking system securing said places or things.

Now referencing FIG. 11 where 500 depicts local/mobile computing device 102 which may be a user's desktop computer, tablet computer, PDA, or smart cellular phone and validation database server/website 104 a network resident server site where the validation database 52 resides. This figure depicts a transaction request for physical access initiated by local/mobile computing device 102 through transaction certifying authority 202 which sits between local/mobile computing device 102 and validation database server 104. Transaction certifying authority may be, among other things, a service or security website or part of a network for an organization or company. This depiction shows the process where a group of regenerated specified distinctive identifiers 31 from local/mobile computing device 102 is sent via the transaction certifying authority 202 to the validation database 52 resident on validation database server/website 104 for matching to existing registered specified distinctive identifiers to verify that the local/mobile computing device is registered and valid and physical access can be granted.

The transaction starts at local/mobile computing device 102 processing block 502 request for physical access. Processing block 502 sends signal 354 request access to receive processing block 714.

Processing block 714 will, after receiving signal 354 will determine if the account being used in this access request requires validation of the local/mobile computing device 102 based on records maintained by the transaction certifying authority 202. If transaction certifying authority 202 determines that validation of a local mobile computing device 102 is required, processing block 714 falls through to processing block 718 if yes notify first software program to execute. Processing block 308 then sends signal 114B execute first software program to start processing block 116B start first software program executing regeneration of the specified distinctive identifiers.

Processing block 116B places first software program (not shown) into execution at call function processing block 118 call function: regenerate, collect and secure data. Processing block 118 then transfers control to call function processing block 552 call function: collect and secure data.

Processing block 116B places first software program (not shown) into execution at call function processing block 118 call function: collect and secure data. Processing block 118 then transfers control to call function processing block 552 call function: collect and secure data.

Processing block 552 will retrieve the specified distinctive identifiers and if required, will query the user for a password which will be saved. As this is the initial registration of local/mobile computing device 102, group type 22 (FIGS. 2A and 2B) will be set to initial specified distinctive identifiers and the ID of first software program 23 and the users inputted password may be captured and saved in group of distinctive identifiers 31 password 26. Finally, group of distinctive identifiers with first software program ID 23 may be secured by each element of group of distinctive identifiers 31 being hashed and/all all elements of group of distinctive identifiers being encrypted through the use of a public key embedded within first software program. After the group of distinctive identifiers has been secured control will be returned to processing block 118 where control will fall through to transmit processing block 120A transmit all secured data and ID of first software program to second software program and securely erase memory. Processing block 120B transmits group of distinctive identifiers 31 as signal 122B regenerated distinctive identifiers to second software program 124 residing in validation database server/website 104 then securely erases any memory locations in local/mobile computing device 102 that were used to construct group of distinctive identifiers 31.

Processing block 120B transmits group of specified distinctive identifiers 31 as signal 122B regenerated distinctive identifiers to receive processing block 310 receive secured distinctive identifiers which then sends validation request signal 132 validation request which includes signal 122B regenerated distinctive identifiers to second software program 124. After processing block 310 sends signal 132, control will fall through to securely erase processing block 131 securely erase all memory used to process the regenerated secured specified distinctive identifiers.

Second software program 124 receives validation request after which control falls through to recover processing block 126 recover distinctive identifiers from validation request 132.

Processing block 126 will, if secured group of specified distinctive identifiers 122B was encrypted prior to transmission, decrypt encrypted regenerated distinctive identifiers 122B, using the private key for second software program 124. If group of specified distinctive identifiers 31 were not hashed prior to transmission, they will be hashed at this time with the exception of first software program ID 23 after which control will fall through to call function processing block 316 call function: attempt match of regenerated specified distinctive identifiers 602.

Call function processing block 602 will search validation database 52, which is a collection of a group of registered specified distinctive identifiers 31. Validation database 52 is searched using current received group of regenerated distinctive identifiers as the data object to be matched. If a match is not made between current received group of regenerated specified distinctive identifiers and any group of registered specified distinctive identifiers contained in the validation database, additional searches may be made that exclude any of the regenerated distinctive identifiers in the current received group of regenerated distinctive identifiers that have their associated state flag 32 set to "don't care". If no match was found with the "don't care" state flag 32 set, the return will be set to NO MATCH. If the additional searches found a match, the return will be set to MATCHED. If the first search results in a match being found, the return will be set to MATCHED. After the search has been performed control will be returned to processing block 316 after which control will fall through to return processing block 318 return response.

Processing block 318 will send signal 142 match response to decision processing block 322 response=matched?. After signal 142 has been sent, control will fall through to securely erase processing block 136 which will securely erase all memory used to process the regenerated secured specified distinctive identifiers.

Processing block 322 will, if signal 142=MATCHED, transfer control to additional processing block 338, additional criteria to decline transaction.

Processing block 338 will examine the user's account to determine if there are additional criteria that would cause the transaction to be declined. If there is no additional criteria to decline the transaction control will fall through to results processing block 340 NO, after which control will fall through to send processing block 342 send return=ACCEPT transaction. Processing block 342 will send signal 344 ACCEPT to notify processing block 506 Notify user physical access granted. If processing block 338 found additional criteria that would cause the transaction to be declined control will be transferred to send processing block 330 send return=decline transaction. Processing block 330 will send signal 332 DECLINE to notify processing block 504 notify user physical access declined.

If Processing block 322 determines that signal 142=NOT MATCHED, it will transfer control to additional processing block 326, additional criteria to accept transaction. If processing block 326 did not find additional criteria that would cause the transaction to be accepted, control will be transferred to send processing block 330 send return=decline transaction. Processing block 330 will send signal 332 DECLINE to notify processing block 504 notify user application access declined.

Figure 12:
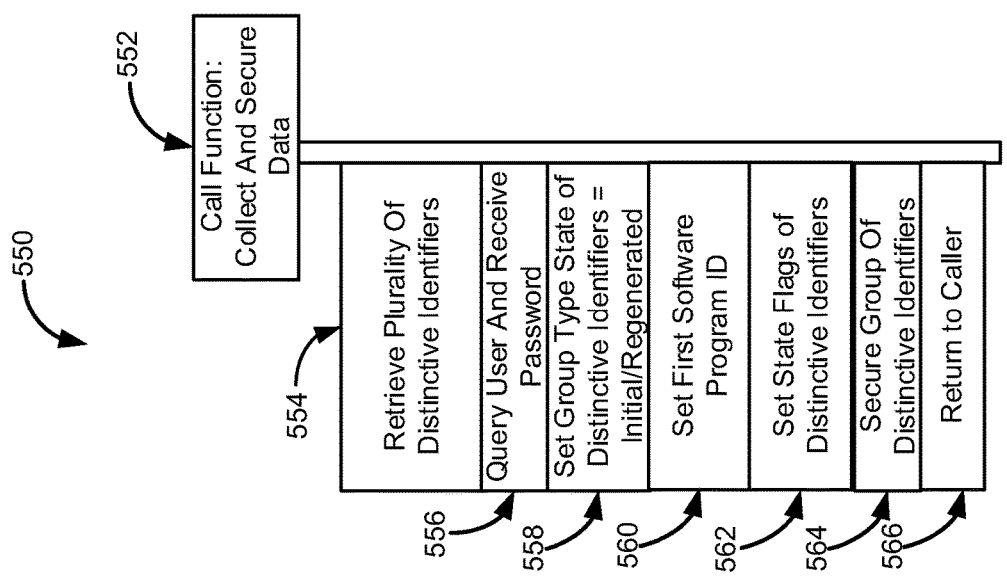
FIG. 12 is a depiction of a callable function that collects and secures data.

Now referencing FIG. 12 where 550 depicts a callable function 552 to collect and secure data. This function collects a predetermined number of hardware and/or software identifying characteristics along with a user's password if it is determined that the password is required and the preset ID of first software program. Processing for callable function 552 begins at retrieve processing block 554.

Process block 554 captures the predetermined set of hardware and/or software identifying characteristics. Hardware identifiers may consist of but are not limited to media access control identifiers (MAC) assigned to devices such as wifi chip sets, Bluetooth chip sets, USB ports, and USB devices. A MAC identifier is a 24-bit number that uniquely identifies a vendor, manufacturer, or other organization globally or worldwide. Software identifiers are unique numbers assigned to major software modules such as operating systems and/or major application modules. Process block 554 will gather the required number of unique specified distinctive identifiers and place them into a group of specified distinctive identifiers 31 after which control will fall through to query process block 556

Process block 556 will, if it is determined that a user's password is required, query the user and wait for the user to enter their password. If it is determined that the user's password is not required, then the user will not be queried for a password. After the user's password is captured or determined that it is not needed control will fall through to set state processing block 558 set group type state of specified distinctive identifiers=Initial/Regenerated.

Process block 558 will set an identifier into group type 22 of group of specified distinctive identifiers 31. Group type 22 has two possible states. The first state="INITIAL" which will indicate to second software program, when it receives a group of specified distinctive identifiers 31, if it should insert group of specified distinctive identifiers 31 into the validation database 52. The second state="REGENERATED" which will indicate to second software program, when it receives a group of specified distinctive identifiers 31, if it should attempt to match the received group of specified distinctive identifiers 31 against those groups of identifiers 31 maintained in the validation database 52. After group type 22 of group of specified distinctive identifier 31 has been set control will fall through to process block 560 set first software program ID.

Process block 560 will capture the ID of first software program which is unique to the user/owner of the local/mobile computing device 102. All local/mobile computing devices registered by the user/owner of the devices will contain the same first software ID. Process block 560 will capture the ID and place it into first software ID 23 of group of specified distinctive identifiers 31 after which control will fall through to set state flags processing block 562 set state flags of specified distinctive identifiers.

Processing block 562 will set a state flag 32 associated with each of the specified distinctive identifiers 24 of group of specified distinctive identifiers 31. Each state flag 32 has two possible states. The first state="MATCH" which indicates to second software program 124 that this specified distinctive identifier being matched against the validation database must be matched. The second state="DON'T CARE" indicates to second software program 124 that this specified distinctive identifier does not need to be matched against the validation database. The reason for these states is that some hardware module or software module contained in local/mobile computing device may have changed. The "DON'T CARE" state allows the device to continue being used without having to register the local/mobile computing device. After all of state flag 31s have been set control will fall through to secure processing block 564 secure specified distinctive identifiers.

Processing block 564 will secure group of specified distinctive identifiers 31. Group of specified distinctive identifiers 31 may be secured by hashing each element of group of specified distinctive identifiers with the exception of first software program ID 23 and/or group of specified distinctive identifiers may be encrypted. Encryption will encrypt ALL elements of group of specified distinctive as a package or vault using a public key belonging to second software program 124 which is embedded inside of first software program (not shown). Once a group of specified distinctive identifiers has been secured, control will fall through to return processing block 566 return to caller.

Processing block 566 will returned control to call function process block 118 call function: collect and secure data.

Figure 13:
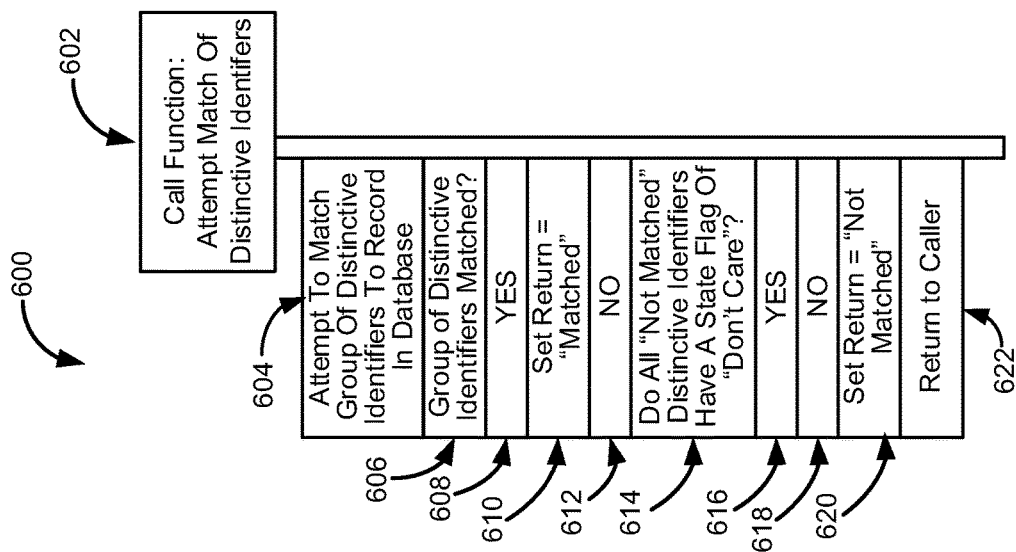
FIG. 13 is a depiction of callable function that attempts to match regenerated specified distinctive identifiers to registered specified distinctive identifiers.

Now referencing FIG. 13 where 600 depicts callable function 602 Call Function: attempt match of specified distinctive identifiers which is the matching process performed by second software program 124 when it receives a group of specified distinctive identifiers for matching against the validation database 52. Processing for callable function 602 begins at attempt processing block 604 attempt to match group of specified distinctive identifiers to record in validation database.

Processing block 604 will pass the currently received group of specified distinctive identifiers 31 against records of group of specified distinctive identifiers 31 that have been registered into the validation database 52. After the currently received group of specified distinctive identifiers 31 have been scanned through the validation database control will fall through to decision processing block 606 group of specified distinctive identifiers matched? after which control will fall through to results processing block 608 YES.

Processing block 608 will, if the currently received group of specified distinctive identifiers 31 has been matched against one of the records in the validation database 52, control will fall through to set processing block 610. If the currently received group of specified distinctive identifiers 31 was not successfully matched against one of the records in the validation database 52, control will fall through to results processing block 612 NO after which control will fall through to decision processing block 614 do all "Not Matched" specified distinctive identifiers has a state flag of "Don't Care"?.

Processing block 610 (group of specified distinctive identifiers 31=MATCHED) will set the return=Matched after which control will be transferred to return processing block 622 return to caller.

Processing block 614 will, if all of the specified distinctive identifiers that did not match, have an associated state flag32="Don't Care" control will fall through to results processing block 616 YES after which control will be transferred to set processing block 610 set return="Matched" after which control will be transferred to return processing block 622 return to caller. If any of the specified distinctive identifiers that did not match, have an associated state flag32="Match" control will fall through to results processing block 618 NO after which control will fall through to set processing block 620 set return="Not Matched" after which control will fall through to return processing block 622 return to controller.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification. Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein. Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system whereby an online website, acting as a certifying authority for authorized access to a user's online account at said online website, is electronically coupled to a user's local/mobile computing device and to a Validation Database Server/Web Server, and uses specified distinctive identifiers drawn from said local/mobile computing device to validate and authorize access to said online website account:

a. a user initiates an online website account access request via a local/mobile computing device;

b. Said local/mobile computing device is communicably coupled to said online website and transmits identity and account information to said online website;

c. Said identity and account information transmitted by the local/mobile computing device is defined by the account access authorization policies of said online website and includes a user name or email address, one or more passwords and/or biometric marker information identifying a rightful account owner;

d. said online website examines the identity and account information submitted by the local/mobile computing device and determines that access to said account requires validation matching of said specified distinctive identifiers with said Validation Database Server/Web Server as part of said access authorization process;

e. said online website sends a regenerate specified distinctive identifiers request to said local/mobile computing device;

f. a first software program resident and executing on said local/mobile computing device receives said regenerated specified distinctive identifiers request;

g. said first software program regenerates a set of specified distinctive identifiers from said local/mobile computing device, said regenerated specified distinctive identifiers are obtained from hardware modules and/or software modules resident on said local/mobile computing device;

h. said first software program secures said set of regenerated specified distinctive identifiers by hashing said set of regenerated specified distinctive identifiers then electronically transmits said set of regenerated specified distinctive identifiers to said online website which requested the regenerate specified distinctive identifiers request;

i. said first software program upon transmitting the regenerated specified distinctive identifiers securely erases the results of the regenerated specified distinctive identifiers from the local/mobile computing device;

j. said online website electronically receives said regenerated specified distinctive identifiers and forwards said regenerated specified distinctive identifiers to said Validation Database Server/Web Server;

k. after electronically forwarding said regenerated specified distinctive identifiers to said Validation Database Server/Web Server, online website securely erases the results of the regenerated specified distinctive identifiers from the online website;

l. said validation database server/web server contains a second software program which attempts to match the received set of said regenerated specified distinctive identifiers to at least one set of said specified distinctive identifiers from a plurality of local/mobile computing devices previously registered in said validation database;

m. if said second software program matches received set of said regenerated specified distinctive identifiers against at least one set of said previously registered specified distinctive identifiers from a plurality of local/mobile computing devices, said second software program electronically notifies said online website of said matching and if said second software program does not find a match between said received set of regenerated specified distinctive identifiers against at least one set of said previously registered selected distinctive identifiers from a plurality of local/mobile computing devices, said second software program electronically notifies said online website that said match was not made;

n. if said online website receives from said validation database server/website server an electronic notice that a match was made between said received set of regenerated specified distinctive identifiers and at least one set of said previously registered specified distinctive identifiers from a plurality of local/mobile computing devices, said online website notifies said local/mobile computing device that said account access request is accepted;

o. if said online website receives from said validation database server/Web Server electronic notice that a match was not made between said received set of regenerated specified distinctive identifiers and at least one set of said previously registered specified distinctive identifiers from a plurality of local/mobile computing devices, said online website electronically notifies said local/mobile computing device that authorized access to a user's online account is denied;

p. said second software program upon transmitting said match results to said online website securely erases said regenerated specified distinctive identifiers from said validation database/web server.

2. The system of claim 1 whereby the specified distinctive identifiers of said local/mobile computing device that are collected, processed, and electronically transmitted by said first software program also includes a unique identification string of characters associated with said first software program, said string of characters includes one or more characters that identify the specific local/mobile computing device and all such passwords, biometric markers, and unique identification strings of characters shall be hashed prior to transmission to said online website.

3. The system of claim 1 whereby said first software program remains resident in the local storage of the local/mobile computing device.

4. The system of claim 1 whereby said first software program remains resident within an Internet browser of the local/mobile computing device.

5. The system of claim 1 whereby said first software program is a run/terminate/dissolve program that never stays resident in the local/mobile computing device and is re-introduced for each requested transaction.

6. The system of claim 1 whereby if said online website receives from said validation database server/website server an electronic notice that a match was made between said received set of regenerated specified distinctive identifiers and at least one set of said previously registered specified distinctive identifiers from a plurality of local/mobile computing devices, said online website examines a database containing other details of said user's account to determine if additional criteria exists that negates a match notification after which said online website shall, if said additional criteria exists, electronically notify said local/mobile computing device that authorized access to the user's online account is denied and if said database does not contain additional criteria to negate said match notification, said online website electronically notifies said local/mobile computing device that authorized access to the user's online account is accepted.

7. The system of claim 1 whereby if said online website receives from said validation database server/Web Server electronic notice that a match was not made between said received set of regenerated specified distinctive identifiers and at least one set of said previously registered specified distinctive identifiers from a plurality of local/mobile computing devices, said online website examines a database containing details of said user's account to determine if additional criteria exists that negates a not match notification after which said online website shall, if said additional criteria exists, electronically notify said local/mobile computing device that the authorized access to the user's online account is accepted and if said database does not contain additional criteria to negate said not matched notification, said online website electronically notifies said local/mobile computing device that the authorized access to the user's online account is denied.

8. A method whereby an online website, acting as a certifying authority for authorized access to a user's online account at said online website, is electronically coupled to the user's local/mobile computing device and to a Validation Database Server/Web Server, and uses specified distinctive identifiers drawn from said local/mobile computing device to validate and authorize access to said online website accounts comprising:

a. said user initiates an online website account access request via a local/mobile computing device;

b. Said local/mobile computing device is electronically coupled to said online website and transmits identity and account information to said online website;

c. Said identity and account information transmitted by the local/mobile computing device is defined by the account access authorization policies of said online website and includes a user name or email address, one or more passwords and/or biometric marker information identifying a rightful account owner;

d. said online website examines the identity and account information submitted by the local/mobile computing device and determines that access to said account requires validation matching of said specified distinctive identifiers with said Validation Database Server/Web Server as part of said access authorization process;

e. said online website sends a regenerate specified distinctive identifiers request to said local/mobile computing device;

f. a first software program resident and executing on said local/mobile computing device receives said regenerate specified distinctive identifiers request;

g. said first software program regenerates a set of specified distinctive identifiers from said local/mobile computing device, said regenerated specified distinctive identifiers are obtained from hardware modules and/or software modules resident on said local/mobile computing device;

h. said first software program secures said set of regenerated specified distinctive identifiers by hashing said set of regenerated specified distinctive identifiers then electronically transmits said set of regenerated specified distinctive identifiers to said online website which requested the regenerate specified distinctive identifiers request;

i. said first software program upon transmitting the regenerated specified distinctive identifiers securely erases the results of the regenerated specified distinctive identifiers from the local/mobile computing device;

j. said online website electronically receives said regenerated specified distinctive identifiers and forwards said regenerated specified distinctive identifiers to said Validation Database Server/Web Server;

k. after electronically forwarding said regenerated specified distinctive identifiers to said Validation Database Server/Web Server, said online website securely erases the results of the regenerated specified distinctive identifiers from the online website;

l. said validation database server/web server contains a second software program which attempts to match the received set of said regenerated specified distinctive identifiers to at least one set of said specified distinctive identifiers from a plurality of local/mobile computing devices previously registered in said validation database;

m. if said second software program matches said received set of said regenerated specified distinctive identifiers against at least one set of said previously registered specified distinctive identifiers from a plurality of local/mobile computing devices, said second software program will electronically notify said online website of said matching and if said second software program does not find a match between said received set of regenerated specified distinctive identifiers against at least one set of said previously registered selected distinctive identifiers from a plurality of local/mobile computing devices, said second software program will electronically notify said online website that said match was not made;

n. if said online website receives from said validation database server/website server an electronic notice that a match was made between said received set of regenerated specified distinctive identifiers and at least one set of said previously registered specified distinctive identifiers from a plurality of local/mobile computing devices, said online website electronically notifies said local/mobile computing device that said account access request is accepted;

o. if said online website receives from said validation database server/Web Server electronic notice that a match was not made between said received set of regenerated specified distinctive identifiers and at least one set of said previously registered specified distinctive identifiers from a plurality of local/mobile computing devices, said online website electronically notifies said local/mobile computing device that authorized access to a user's online account is denied;

p. said second software program upon transmitting said match results to said online website securely erases said regenerated specified distinctive identifiers from said validation database/web server.

9. The method of claim 8 whereby said specified distinctive identifiers collected during the regeneration process by said first software program executing on said initiating local/mobile computing device includes said user and includes a unique identification string of characters associated with said first software program, said string of characters includes one or more characters that identify the specific local/mobile computing device.

10. The method of claim 8 whereby said first software program remains resident within an Internet browser of the local/mobile computing device.

11. The method of claim 8 whereby said first software program is a run/terminate/dissolve program that never stays resident in the local/mobile computing device and is re-introduced for each requested transaction.

12. The system of claim 8 whereby if said online website receives from said validation database server/website server an electronic notice that a match was made between said received set of regenerated specified distinctive identifiers and at least one set of said previously registered specified distinctive identifiers from a plurality of local/mobile computing devices, said online website examines a database containing other details of said user's account to determine if additional criteria exists that negates a match notification after which said online website shall, if said additional criteria exists, electronically notify said local/mobile computing device that authorized access to the user's online account is denied and if said database does not contain additional criteria to negate said match notification, said online website electronically notifies said local/mobile computing device that authorized access to the user's online account is accepted.

13. The system of claim 8 whereby if said online website receives from said validation database server/Web Server electronic notice that a match was not made between said received set of regenerated specified distinctive identifiers and at least one set of said previously registered specified distinctive identifiers from a plurality of local/mobile computing devices, said online website examines a database containing details of said user's account to determine if additional criteria exists that negates a not match notification after which said online website shall, if said additional criteria exists, electronically notifies said local/mobile computing device that the authorized access to the user's online account is accepted and if said database does not contain additional criteria to negate said not matched notification, said online website electronically notifies said local/mobile computing device that the authorized access to the user's online account is denied.

* * * * *